United States Patent
Gupta et al.

(10) Patent No.: US 12,423,504 B1
(45) Date of Patent: Sep. 23, 2025

(54) ADAPTIVE PATH BASED ANALYSIS PROCESS

(71) Applicant: Cadence Design Systems, Inc., San Jose, CA (US)

(72) Inventors: Umesh Gupta, Noida (IN); Marut Agarwal, Ghaziabad (IN); Satyendra Patel, Noida (IN); Naresh Kumar, Uttar Pradesh (IN); Prashant Sethia, San Jose, CA (US); Ankit Sethi, Delhi (IN); Shubham Kumar, Mohali (IN)

(73) Assignee: Cadence Design Systems, Inc., San Jose, CA (US)

( * ) Notice: Subject to any disclaimer, the term of this patent is extended or adjusted under 35 U.S.C. 154(b) by 590 days.

(21) Appl. No.: 17/894,236

(22) Filed: Aug. 24, 2022

(51) Int. Cl.
*G06F 30/398* (2020.01)
*G06F 30/27* (2020.01)
*G06F 119/12* (2020.01)

(52) U.S. Cl.
CPC ............ *G06F 30/398* (2020.01); *G06F 30/27* (2020.01); *G06F 2119/12* (2020.01)

(58) Field of Classification Search
CPC .. G06F 30/392; G06F 30/398; G06F 2119/12; G06F 30/394; G06F 30/39; G06F 30/327; G06F 30/337; G06F 30/373; G06F 2119/18; G06F 30/30; G06F 30/33; G06F 30/20; G06F 30/3947; G06F 30/00; G06F 30/396; G06F 30/36; G06F 30/3315; G06F 30/333; G06F 30/3312; G06F 30/3953; G06F 30/18; G06F 30/367; G06F 30/27; G06F 30/3323; G06F 30/35; G03F 1/36
USPC ................................................. 716/106–115
See application file for complete search history.

(56) References Cited

U.S. PATENT DOCUMENTS

| | | | | |
|---|---|---|---|---|
| 9,875,333 | B1* | 1/2018 | Verma | G06F 30/3312 |
| 10,031,986 | B1* | 7/2018 | Kumar | G06F 30/3312 |
| 10,776,547 | B1* | 9/2020 | Gupta | G06F 16/9024 |

\* cited by examiner

*Primary Examiner* — Binh C Tat
(74) *Attorney, Agent, or Firm* — Mark H. Whittenberger; Holland & Knight LLP

(57) ABSTRACT

The present disclosure relates to a system and method for electronic design automation. Embodiments may include loading one or more libraries, netlists, or constraints associated with an electronic design and loading parasitic data associated with the electronic design. Embodiments may further include performing a self adaptive, infinite depth, path based analysis on at least a portion of the electronic design. Embodiments may also include analyzing the electronic design based upon, at least in part, the self adaptive, infinite depth, path based analysis.

13 Claims, 22 Drawing Sheets

ADAPTIVE PATH BASED ANALYSIS PROCESS

FIELD OF THE INVENTION

The present disclosure relates to electronic design automation (EDA), and more specifically, to a method for performing path based analysis on an electronic design.

DISCUSSION OF THE RELATED ART

EDA utilizes software tools that may be used in the design and analysis of numerous electronic systems such as printed circuit boards (PCBs) and integrated circuits (ICs). Some EDA tools utilize static timing analysis as a method to assess the timing of any given digital circuit using software techniques and certain models that provide relevant characteristics of the digital circuit.

SUMMARY

In one or more embodiments of the present disclosure, a computer-implemented method for electronic design automation is provided. The method may include loading one or more libraries, netlists, or constraints associated with an electronic design and loading parasitic data associated with the electronic design. The method may further include performing a self adaptive, infinite depth, path based analysis on one or more timing analysis views associated with the electronic design. The method may also include analyzing the electronic design based upon, at least in part, the self adaptive, infinite depth, path based analysis.

One or more of the following features may be included. In some embodiments, the self adaptive, infinite depth, path based analysis may include a clock period based identification process. The self adaptive, infinite depth, path based analysis may include an explicit include or explicit exclude user-selectable option or a default. The self adaptive, infinite depth, path based analysis may include an endpoint violation level analysis. The method may include performing a full depth analysis for an endpoint having a high level violation. Performing a full depth analysis for an endpoint having a high level violation may include identifying all endpoint violations associated with the electronic design. The method may include determining a plurality of paths for at least one high level violation endpoint. The method may further include generating, using an adaptive learning engine, a self adaptive, infinite depth, path based analysis graph for one or more selective zones, one or more violating zones, one or more zones specific to a specified clock group, a user specified region, or an entire graph.

In some embodiments, a computer-readable storage medium having stored thereon instructions that when executed by a machine result in one or more operations is provided. Operations may include loading one or more libraries, netlists, or constraints associated with an electronic design and loading parasitic data associated with the electronic design. Operations may further include performing a self adaptive, infinite depth, path based analysis on one or more timing analysis views associated with the electronic design. Operations may also include analyzing the electronic design based upon, at least in part, the self adaptive, infinite depth, path based analysis.

One or more of the following features may be included. In some embodiments, the self adaptive, infinite depth, path based analysis may include a clock period based identification process. The self adaptive, infinite depth, path based analysis may include an explicit include or explicit exclude user-selectable option or a default. The self adaptive, infinite depth, path based analysis may include an endpoint violation level analysis. The method may include performing a full depth analysis for an endpoint having a high level violation. Performing a full depth analysis for an endpoint having a high level violation may include identifying all endpoint violations associated with the electronic design. Operations may include determining a plurality of paths for at least one high level violation endpoint. Operations may further include generating, using an adaptive learning engine, a self adaptive, infinite depth, path based analysis graph for one or more selective zones, one or more violating zones, one or more zones specific to a specified clock group, a user specified region, or an entire graph.

In one or more embodiments of the present disclosure, a system may include a computing device having at least one processor configured to load one or more libraries, netlists, or constraints associated with an electronic design. The at least one processor may be further configured to load parasitic data associated with the electronic design. The at least one processor may be further configured to perform a self adaptive, infinite depth, path based analysis on one or more timing analysis views associated with the electronic design and to analyze the electronic design based upon, at least in part, the self adaptive, infinite depth, path based analysis. One or more of the following features may be included. In some embodiments, the self adaptive, infinite depth, path based analysis may include a clock period based identification process. The self adaptive, infinite depth, path based analysis may further include an explicit include or explicit exclude user-selectable option or a default. The self adaptive, infinite depth, path based analysis may also include an endpoint violation level analysis.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
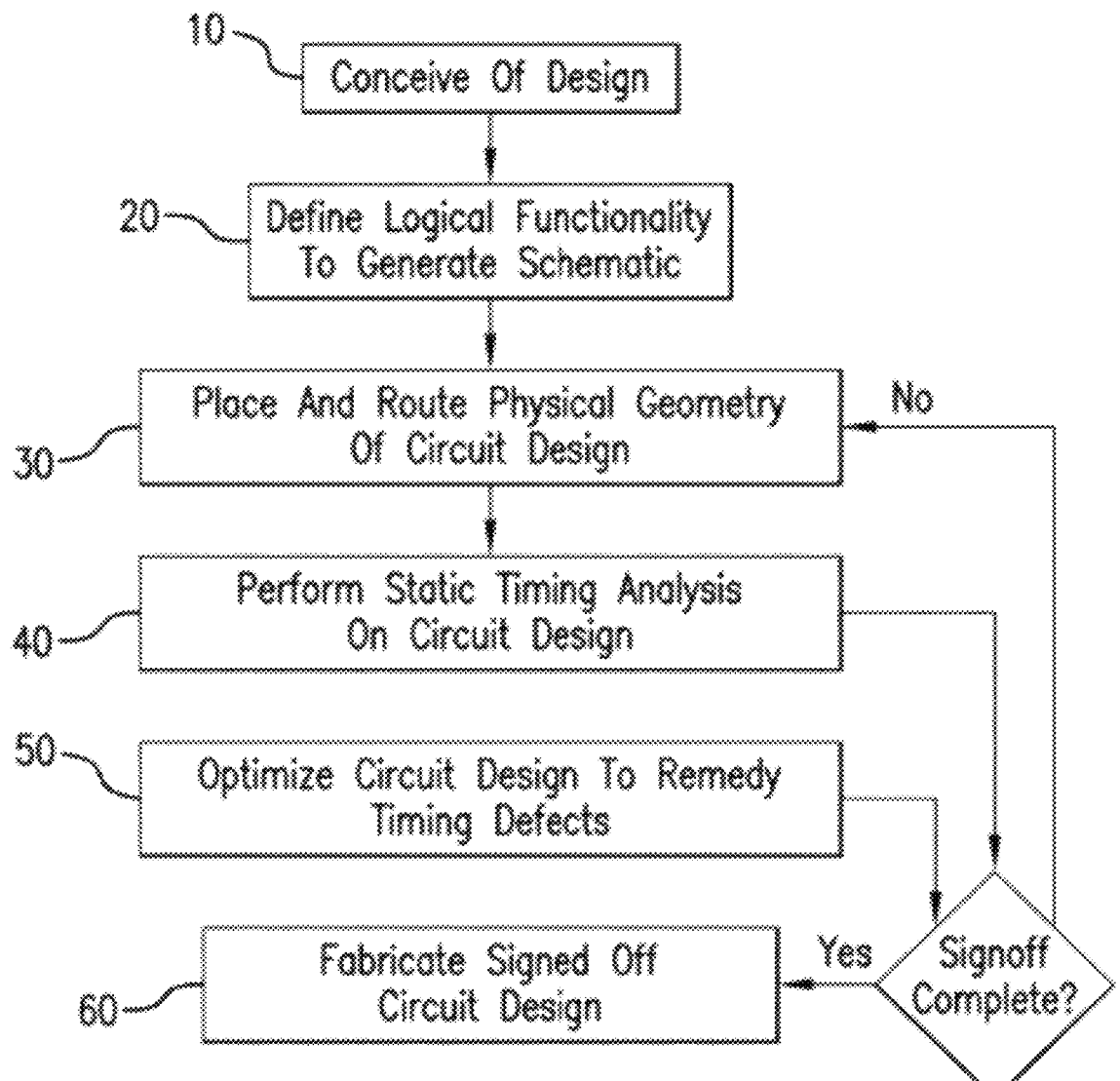
FIG. 1 is a flow diagram illustrating an exemplary electronic design automation (EDA) design flow beginning with a conceived design and culminating in a physical, tangible, operable fabricated device.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

An EDA flow traverses recursively through a plurality of stages towards the actual fabrication of complex integrated circuit devices, micro chips and systems. Device designs as small as a microcontroller in a smartwatch to devices as large as a very complex SOC including a plurality of cores coupled to an on chip memory and I/O are extensively planned out, verified, and remedially modified/transformed repeatedly to arrive at a fabricated tangible physical device. At first, an engineer or designer has an idea for a new circuit design or device. This idea may then be mapped out into a logical schematic data defining a qualitative view of the functional goals of the device and interconnections amongst components thereof. For example, a terminal Y of an AND logic gate AND1 is coupled to a terminal B of an OR logic gate OR1 and a terminal Y of OR1 proceeds to an output2 to define segments of a path through the design. If the design receives an input X on AND1/A, then an output X should follow at a certain output, for example, OR1/Y.

A physical layout implementation stage builds upon such logical schematic abstraction of the data design to generate data specifying how such logical schematic may actually be implemented physically. A physical layout may be generated by placement and routing steps to include geometries and placement coordinates of components such as gates, buffers, registers, flip-flops, and all manner of electrical integrated circuit structures along with routing interconnections between these components.

Further data abstractions such as a mask pattern which may be the ultimate or final step prior to fabrication of the physical device embodying the circuit design may be included in the circuit design data as well. The totality of all the physical implementation data abstractions plus extrinsic data may collectively define the circuit design.

The placement and routing steps allocate the placement for these individual components on a semiconductor substrate, such as silicon, germanium, or the like, with actual physical geometries and a physical coordinate-mapped organization reflecting how the circuit design will be actually fabricated on the silicon substrate by optical lithography or other such fabrication measures. The routing portion seeks to interconnect each of the individual components (such as an AND, OR, buffers, and the like) to allow a signal to pass therethrough, thereby defining a path consisting of a set of segments between nodes through the circuit design. Once a physical layout has been generated, a number of extensive verification checks and analyses are performed in a signoff stage to ensure that the physical implementation of both the idea and the logical design meet the design goals, rules, and constraints thereupon, and functions as expected.

Signoff may be accomplished by the performance of static timing analyses (STA), amongst other tools, to determine the operational timing characteristics throughout the system design to ensure proper functionality. The STA may include a plurality of different static timing analysis methodologies variously performing different algorithmic checks on the circuit design with attendant accuracy vs. run time trade offs for each. Several examples of different STA analyses include a GBA which performs timing analysis on a node by node level traversing exhaustively throughout the circuit design. A PBA may perform a different set of algorithmic checks on the circuit design which are more realistic, less conservative, and pessimistic than the GBA analysis. In such regard, the PBA analyzer may require a much greater run time, a much greater memory footprint, storage footprint, and extensive processing resources--however, PBA provides a much more accurate, realistic, or less pessimistic set of operational timing characteristics of the circuit design than the GBA analysis. The GBA analysis is generally performed in a faster manner with reduced run time, reduced accuracy and realism, through a conservative or pessimistic approach including several different worst-case assumptions, and a plurality of other measures designed to allow GBA to perform more quickly, though with a reduced accuracy and increased conservatism thereof. Such analysis generally operate, for example, by providing any input A and determining whether an output B arrives at a certain time on an output of the design irrespective of the particular input provided thereto. Such a signoff stage may be extremely slow and time-consuming utilizing a large amount of data, processing resources, temporary storage resources, and large amounts of permanent storage resources for the resultant timing data bases thereof. The signoff, utilizing tools such as the static timing analysis and other such verification tools, must be as close to 100% accurate and thorough as possible as they are the last practical chance to catch any possible timing violations under any possible operational and environmental conditions before vast resources are committed to physical fabrication of often very substantial quantities of the implemented design. Changes to a circuit design after fabrication has commenced may reach astronomically prohibitive costs and complexity and may indeed be impossible without substantial waste and retooling.

Electronic chips, integrated circuits, and systems of all varieties are approaching sizes and complexities never before seen and will continue to exponentially increase unabatedly into the foreseeable future. Gigascale designs already incorporate oftentimes hundreds of millions of instances which each may have several tens of gates. For example, 150 million logical gates may be arranged into one unified coherent system design. The design data characterizing the physical properties and operational characteristics such as timing of these gates and their interconnections may become massive--easily outstripping the capacity of available storage, memory, and processing systems. Hundreds of gigabytes, and even tera or petabytes of data may oftentimes be required for a single design. Therefore, tools facilitating an EDA flow, such as, for example, a placement and routing physical implementation tool or signoff timing analysis tool may not be performed in total all at once by one processor, stored on only one hard drive, or contained in a single machine's memory, but may, instead, need to be broken up into a plurality of partitions to operate in massively parallel processing and storage system configurations to accomplish transformations and analyses thereupon within a reasonably acceptable runtime. Such runtime may, merely illustratively, be an overnight process, or an over-weekend process, however, the lengths of the analyses and remedial corrections thereupon may stretch to several days, several weeks, months or even greater periods of time.

Generally, after a placement and routing design implementation stage has completed, a signoff engine takes the entirety of the design for such exhaustive verification thereof, as discussed above. The signoff engines (and the placement and routing engines to a lesser extent as well) must determine whether the design will work in any and all operating conditions.

Executing one, let alone a plurality of different static timing analyses, is an incredibly processor, time, power, and storage intensive task. Each time a change is made to the design, a battery of tests must be re-run which may oftentimes take several days to perform. Aggregating such delays results in tremendous wasted time, money, and manpower to such an extent that some changes and fixes may be too prohibitively expensive in such terms to actually implement. Any time, for example, the signoff test finds a violation, a repetitive loop of engineering change orders (ECOs) directed to the physical implementation engine must be entered. This ECO loop iterates repetitively through a physical implementation of placement and routing to correct errors or timing violations located and detected in the signoff process. It is only when signoff completes 100% accurately that reporting zero timing violations that the chip may then proceed to production. Even a single minor violation or flaw in the system design such as the minor, but notorious, PENTIUM® bug of the 1990's resulted in approximately half a billion dollars $450 Million of recall and replacement expenses and untold loss of goodwill for INTEL® System designs and marketplace stakes have only increased in the succeeding decades.

Unfortunately, in the physical optimization portion, fixing one violation may actually result in creating more violations. Due to substantial differences between the physical implementation placement and routing engine and the signoff static timing analyses engines, the physical implementation portion often over-fixes or under-fixes detected violations, resulting in substantial re-analyses/fixing loops. The engines perform very different estimations/calculations on the results of the fixes which only exacerbates such loops and leads to the widely divergent design-view, leading to over/ under fixing and in turn resulting in numerous ECO loops and great delay.

The aforementioned fixing may involve resizing a gate to increase a delay to obviate a setup violation, resizing a gate smaller to reduce delay to address a hold type violation, inserting an additional gate to create additional delay, removing unnecessary buffers or gates to reduce delay, and the like.

Only further complicating such processes—owing to the large amounts of data and processing time required at a physical implementation engine, the physical implementation placement and routing (P & R) may only exercise one clock of the circuit design, whereas the signoff STA type engines generally must exercise all paths throughout the design including, potentially, a plurality of clocks whereas the physical optimization engine only exercises the one clock. The plurality of clocks may exist due to a separate clock for a main processor, a memory, or an input/output (I/O) bus. The signoff engine cannot be allowed to miss violations and must therefore be much more accurate and intensive, exercising the entirety of the design, whereas a physical implementation engine may only test a portion of the design due to time, storage, and processing constraints. Moreover, the signoff STA may become aware of parasitics or intercoupling between elements that may not be determined at all in the physical implementation engine. To address some of the incredible resource requirements of the signoff STA, an abbreviated analysis may be performed with highly pessimistic results, for example, the GBA may not analyze each of a plurality of fan-in path timings to a multiple input device, but may instead consider only the worst case and treat that as a propagated value throughout the design for all paths, meaning that if the worst-case meets the timing constraints or requirements, then potentially it can be assumed that any of the inputs with lesser magnitude timing issues will all meet the constraints.

When the physical implementation engine seeks to fix a violation, it generally has a number of strategies to correct such violation, such as, for example, inserting a buffer into the design, such that the signal inputted at a portion A arrives at a portion B on time without a timing violation therein. Alternatively, to introduce a greater or lesser amount of delay in the signal, a particular logic gate or buffer may be resized. Such resizing or insertion of a buffer may change the delay therethrough and may introduce additional rule, constraint, or timing violations. Moreover, the buffer may be inserted in an illegal location conflicting with other components of the design which may only be determined later in the signoff stage, thus resulting in more iterative loops back to implementation to legally place the buffer or move other conflicting components which may again result in further ECO loops. It is seen that such physical implementation and signoff differences and complexities experienced in fixing one problem may result in, for example, 99 new problems. Such repetitive looping among tools along the EDA flow is a substantial impediment to timely fabrication of physical devices for market consumption and constraining costs to recoup on extensive research and development.

Several strategies may be employed to combat the excessive delay and expense typically encountered in electronic circuit design in terms of processing, storage, manpower, and the like. First, signoff STA, such as GBA, PBA, and the like, and physical implementation optimization, may be distributed amongst a plurality of processors which may result in a plurality of host processing systems. For example, if there are 1,000 different modes needing to be analyzed of a circuit design, a first CPU may be responsible for determining a first 500 modes and a second CPU may be responsible for signing off a second 500 modes. It should be noted that this is an extremely simplified example and that any number from 1 to n processors, cores, and systems may be utilized such as in a server farm or massively parallel internal or external cloud-type processing system.

Once the distributed timing and signal integrity analyses are performed, such as, for example, in a static timing analysis engine, such as GBA or PBA, distributed across a plurality of CPUs, then a certain amount of timing data output will be generated by each CPU. Such CPUs generate a massive amount of setup/hold timing graph data and various other operational timing characteristic data of the circuit design under analysis.

To further aid the timing signoff and optimization and reduce the number of iterations of the ECO optimization/signoff loop, corrective remedial transformative actions such as buffer insertions or gate resizing of the circuit design may be performed based on enhanced accuracy and reduced pessimism signoff STA timing databases based on hybrid values from a plurality of selectively executed STA analyses. Whereas, in the past, a purely GBA based timing data base of operational timing characteristics of the circuit design with great pessimism added due to the worst casing therein, a simplified waveform for determining slew, a simplified derating value rather than considering actual path length, and a number of other factors, may have led to a wildly inaccurate GBA timing database for pass on to the optimizer physical implementation placement and routing P&R engine. Such physical optimizer placement and routing is needed to correct each of the timing violations encountered therein such as by the insertion, deletion, or modification of the gate and such fixing may have not been necessary. By enhancing the accuracy of the various STA analyses and the resultant data bases thereof provided as input to the physical optimizer, a large number of unnecessary fixes and resultant repetitive loops may be avoided. By providing enhanced signoff analysis, a physical placement and routing optimizer may obviate a large number of transformative remedial fixes upon the circuit design thereof. An enhanced accuracy signoff STA verification may thereby avoid over-fixing or under-fixing detected timing violations inasmuch as generally detected timing violations may not actually violate, but may be a result of overly cautious miscalculation based on the inaccurate GBA. By removing such pessimistic inaccuracies in the signoff STA and the unnecessary over-fixing and under-fixing of the physical implementation placement and routing optimizer, the repetitive ECO loop is thereby obviated and the attendant expenses thereof are mitigated.

For an integrated circuit product to function and operate properly in use, certain electrical impulses or signals must travel from inputs to outputs and in intermediate stages arriving at certain prescribed times. An exemplary signal might leave a first register at a certain clock pulse and should arrive at another register within another clock pulse. To ensure that the finished fabricated integrated circuit product, such as a SOC, meets these timing requirements and operates as required, a plurality of functional or operational timing verifications are performed on the chip--not only to verify, but also to identify and locate problematic areas which may be violations which could lead to a loss of functionality in the finished product. Moreover, while a certain product such as, for example, an ARM processor, may operate at a first timing regime, such as, for example, 100 MHz or 1 GHz, removing timing violations to allow for faster operation of the chip, such as, for example, at 200 MHz or 2 GHZ, allows for a more versatile processor which may be used in a plurality of different designs, rather than redesigning a separate chip for each product. Still further, the faster the processor may operate, such as, for example, at 2 GHZ, the more operations it is able to perform and the faster the functioning of the operational software run thereon will be. Therefore, timing violations in the circuit design are taken very seriously and any timing violations found therein will need to be remediated, fixed, or corrected. Upon signoff, before the chip is actually physically fabricated, a battery of tests are run on the processor, and a timing model or timing database is generated. The timing database identifies the arrival times at certain locations throughout the circuit of signals therein. If a signal does not reach a certain point by a certain predetermined time, then a timing violation may be found. As discussed above, a certain timing violation may exist at a certain speed or frequency of the chip whereas it may not exist at another lesser or lower frequency or operating speed of the product. The signoff tool analyzes the arrival times in a very pessimistic, conservative, or worst case analysis to ensure that these timing violations do not occur in the finished product. The timing database containing the enumerated times and the violations thereof is generally passed on to the circuit optimizer, physical optimizer, or placement and routing engine to remedy timing violations determined in the product, such as by the insertion of additional logic, such as, for example, buffers, or other gates that help to either increase or reduce delay in either data, clock, or other types of paths throughout the circuit. When a timing database with overly pessimistic, conservative, or worst case values is passed to the fixer, the fixer may seek remedy something that isn't actually broken and thereby introduce unneeded components.

For example, if the fixer is given a timing database indicating a timing violation in the certain path, the fixer may seek to insert additional gates to increase delay to thereby solve a problem. However, it may be that the timing values and violations found therein are overly pessimistic or overly optimistic and therefore depart from a realistic assessment of timing propagation throughout the circuit design. When a timing violation is detected, the fixer is given the circuit design to fix and this loop iterates multiples times with the fixer correcting a detected violation and sending the design back to the signoff to verify that it has been fixed and failing the fix, the design iterates back through the optimizer fixer to remediate the problem. This insertion of buffers or additional gates increases the size of the circuit, increases the power drain on the circuit and the cost of the circuit as silicon substrate is very expensive. Therefore, by minimizing circuit design for a circuit product that will be fabricated many millions of times, each incremental savings in space, power, and cost are, in the aggregate, very beneficial to the industry and consumers.

Ideally, a more accurate, realistic, less pessimistic and conservative timing database is passed to the optimizer/fixer such that no false timing violations exist and the fixer is only fixing actual timing violations as they will happen in the IC product. The fixer or optimizer may be guided to avoid over-fixing, under-fixing, or wasting unnecessary cycles on issues which are only remote possibilities that may not even actually exist. To do this, a more accurate or realistic timing engine or sign-off engine is employed, but the time to run such a more accurate or realistic engine may be overly expensive in terms of cost, time, manpower, and delays of entry into the market. Therefore, running a more accurate or realistic timing engine may be prohibitive and may not indeed be possible. Herein, a graph-based analyzer (GBA), which tends to be fast but not very accurate or realistic, may be executed to analyze the circuit design. Performing this graph based analysis generates a timing database of overly pessimistic or unrealistic timing which, in the conventional flow, are passed on to the optimizer or physical placement and routing engine. Based upon those inaccurate and unrealistic values of the timing violations in the circuit design leads to a repetitive loop of introducing unnecessary gates. Each added gate has a corresponding power drain and a size penalty imposed on the design. Such optimizing/fixing substantially delays production of an IC product embodying the circuit design. The PBA, while non-viable for the entirety of the circuit design due to the prohibitively high cost (in terms of runtime, processing power, and storage) thereof, may be selectively employed upon the identified worst timing violations determined in the GBA analysis.

The path-based analyzer generates more realistic and more accurate timing values of the circuit design. The more accurate and more realistic PBA measurements may then be selectively injected into the GBA timing database. The more realistic PBA timing values selectively replace the identified time violating values of the GBA timing database and the newly formed GBA/PBA hybrid timing database is then reconciled firstly to resolve GBA vs. PBA conflict and then to ensure consistency of propagation of values throughout the circuit design. This hybrid GBA/PBA database, once reconciled to be internally consistent, will appear to be a GBA generated database and may be passed on to any known optimizer product. Ideally, this hybrid database has removed all false positive timing violations which may have been identified incorrectly under the overly pessimistic GBA approach.

By removing these false positive violations, unnecessary fixes by the physical placement and routing optimizer are thereby avoided with the attendant benefits of removing unnecessary fixing, the run time requirement thereof, the cost thereof, the costs of insertion of additional gates and additional logic and the resizing of additional logic, to thereby result in a more efficient and more expeditiously generated and verified circuit design for physical fabrication thereof into an operable, tangible, and functional integrated circuit product, such as, for example, a SOC processor.

As seen in the illustrative flow diagram of FIG. 1, a design idea is conceived of at block 10. One or a team of circuit designers then seek to refine the conceived design idea to define logical functionality and generate a logical schematic of the circuit design at block 20. The largely qualitative logical schematic design generated at block 20 is then further refined or elaborated upon to define specific physical geometry and coordinates of each individual gate or element of the design with interconnects defined therebetween at block 30. Block 30 results in the generation of a physical layout of the circuit design. At block 40, the circuit design is signed off by performing a battery of a plurality of different static timing analyses on the circuit design to ensure proper functionality thereof. Such battery of static timing analysis (STAs) may include, for example, a graph-based static timing analysis where the individual nodes in a circuit design are analyzed. The exemplary GBA analysis may involve a plurality of assumptions which reduce accuracy in a conservative manner to indicate false positive violations where actual violations or their magnitudes may not exist or may not be as severe as determined by the less accurate GBA.

Another type of static timing analysis may include path-based analysis (PBA) which analyzes specified paths throughout the circuit design at block 40. Such a PBA may have reduced pessimism by incorporating a number of features that may have been too expensive in terms of processing, storage, runtime, and the like for the graph based analysis. In such manner, the PBA may have a higher accuracy of operational timing characteristics determined, at the expense of a greater runtime and greater expenses in terms of processing, temporary storage, and ultimate data base storage of timing results.

After performing the static timing analyses on the circuit design, a set of nodes and their resultant operational timing characteristics are passed on to the physical circuit optimizer to remedy, in a transformative manner, the timing defects such as discussed above by insertion, deletion, or modification of gates in the circuit design at block 50. Upon conclusion of the execution of block 50 and the optimization or remedial transformation of the circuit design, a final sign off, such as a static timing analysis, at block 40, is performed. Generally blocks 30 to 50 are repetitively iterated many times to converge signoff and physical optimization and arrive at a fully signed off circuit design. Upon completion of signoff and verification, the circuit design is passed at block 60, to be fabricated as fully signed off. At block 60, a number of additional processes may be performed such as optical resolution enhancement, tape out, and the like, whereby the end result is a fully fabricated, physical, tangible, and operable physical product defined by the circuit design thereof.

Figure 1A:
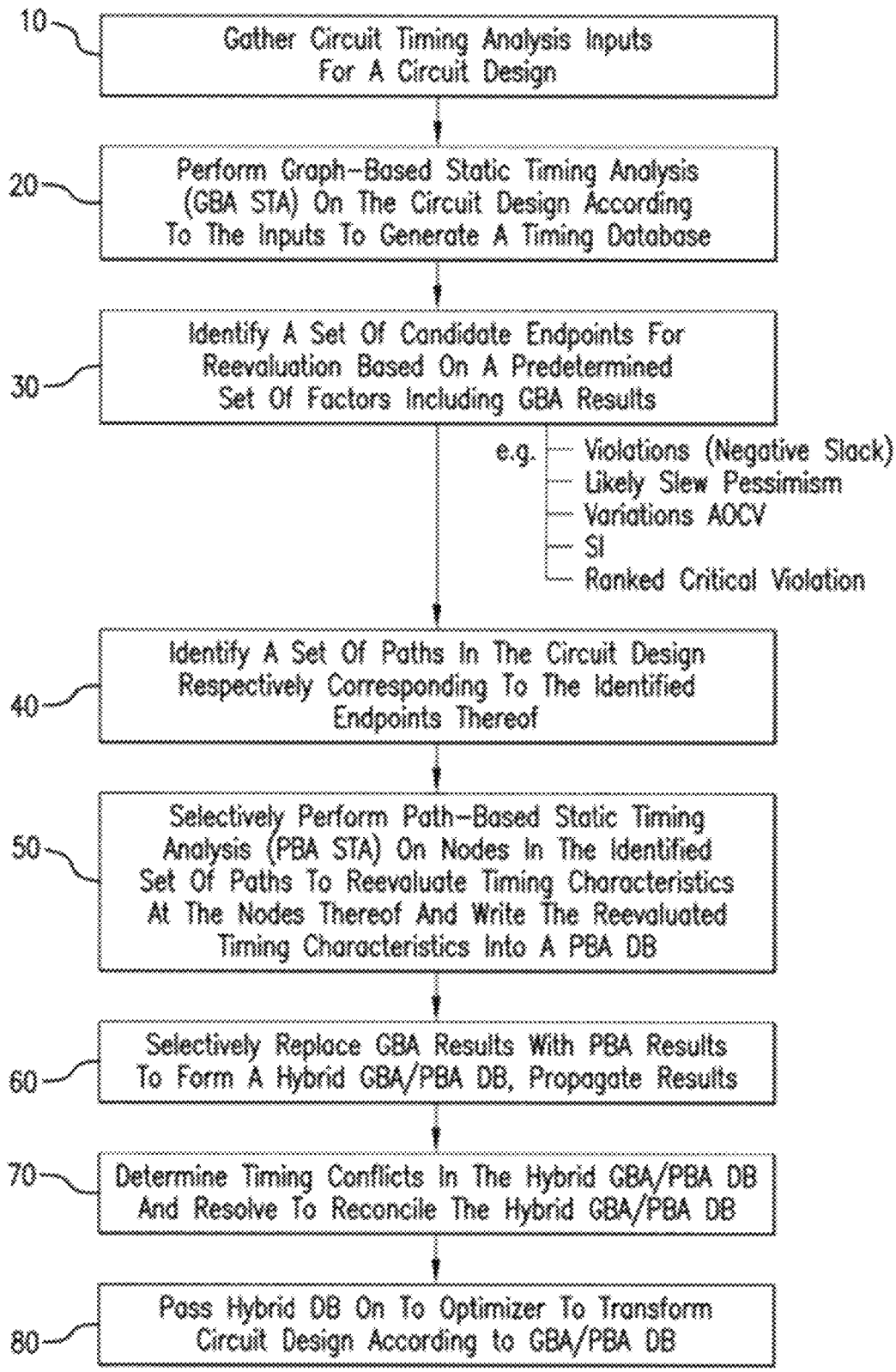
FIG. 1A is a flow diagram illustrating an exemplary enhanced flow for guiding remedial transformations of a circuit design defined by physical implementation data to reduce physical corrections for detected apparent violations in the circuit design.
Figure 1B:
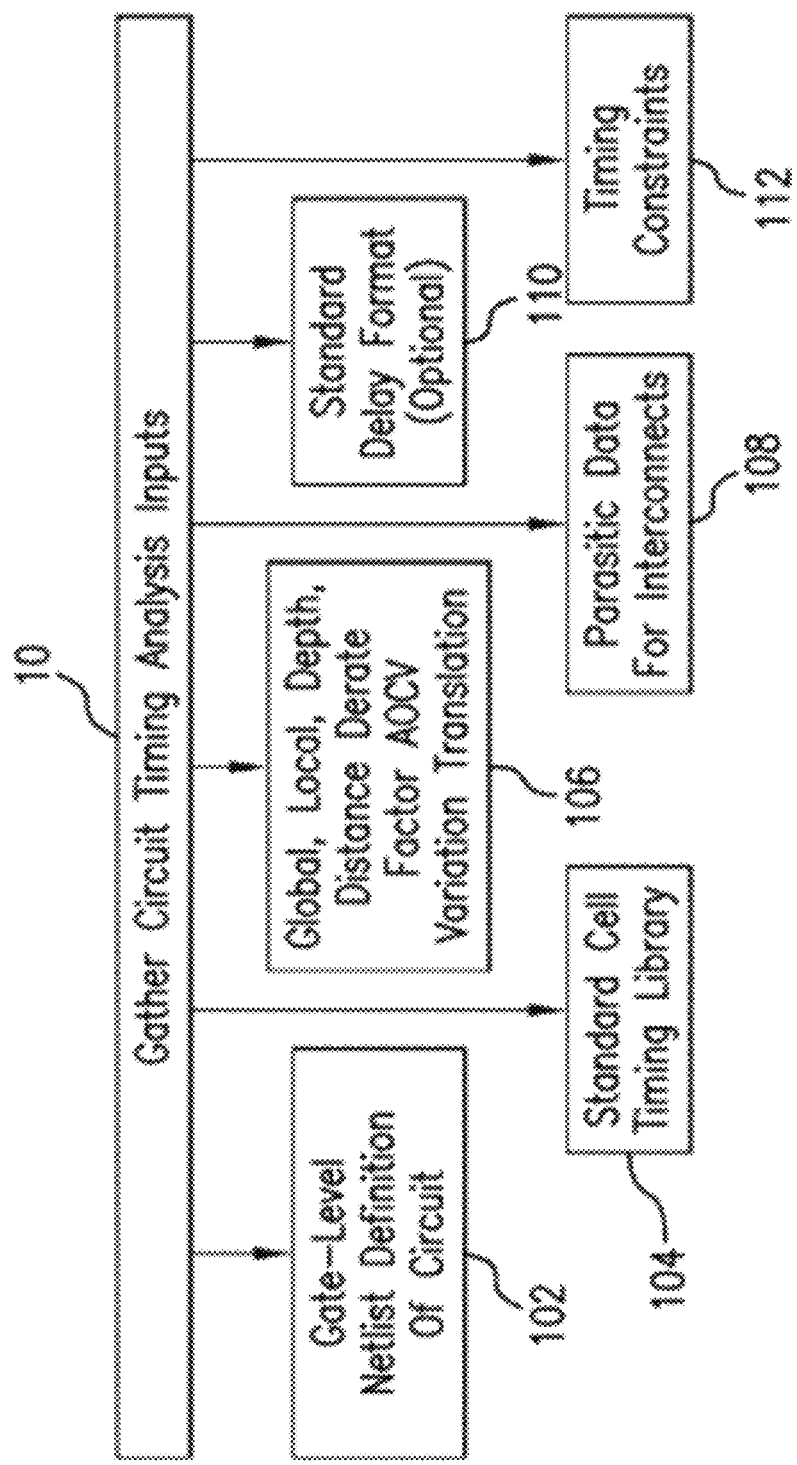
FIG. 1B is an exemplary block diagram illustrating a flow for gathering circuit timing analysis inputs.
Figure 1C:
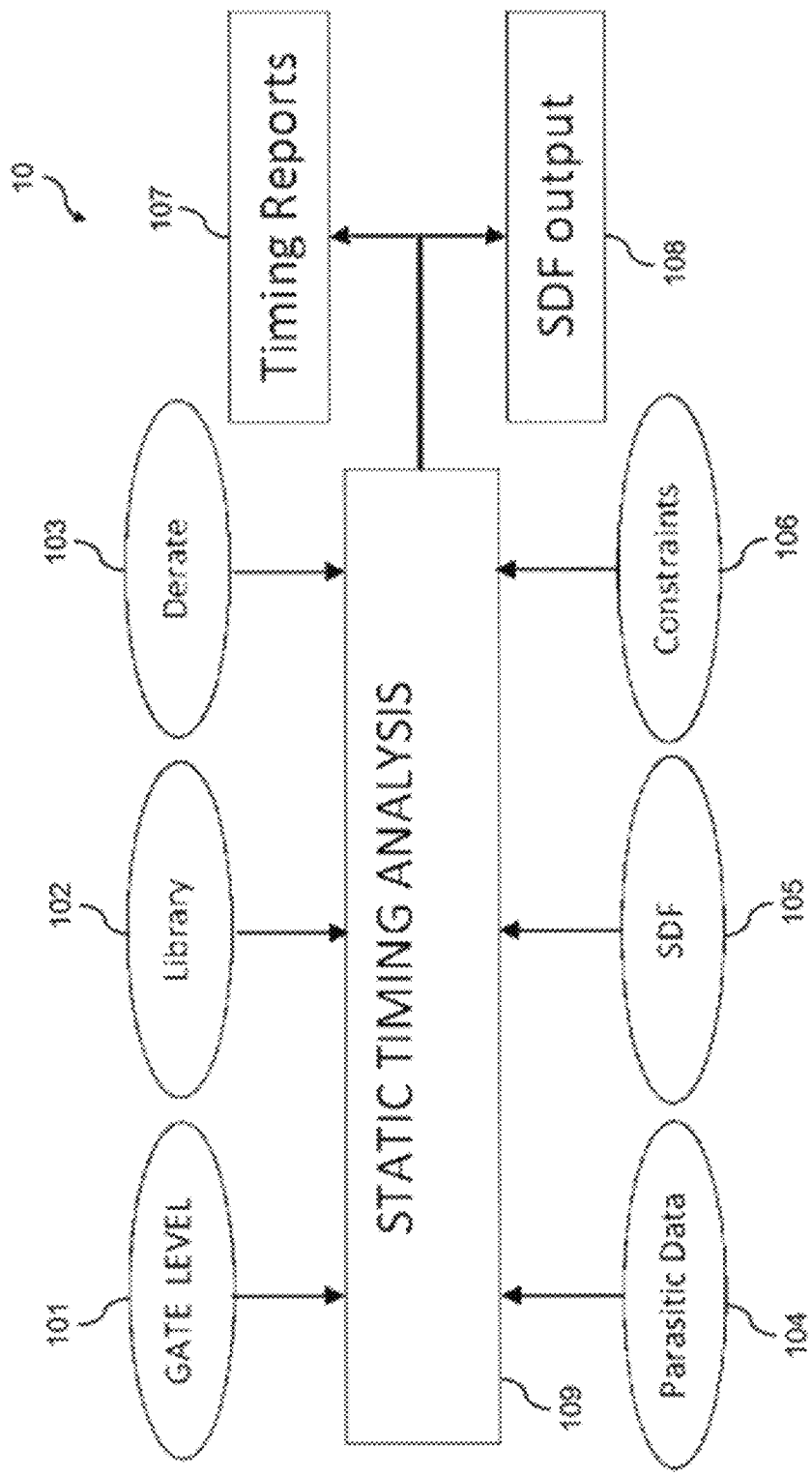
FIG. 1C is an exemplary block diagram illustrating the gathering of multiple inputs for a static timing analysis of the circuit design data.
Figure 1D:
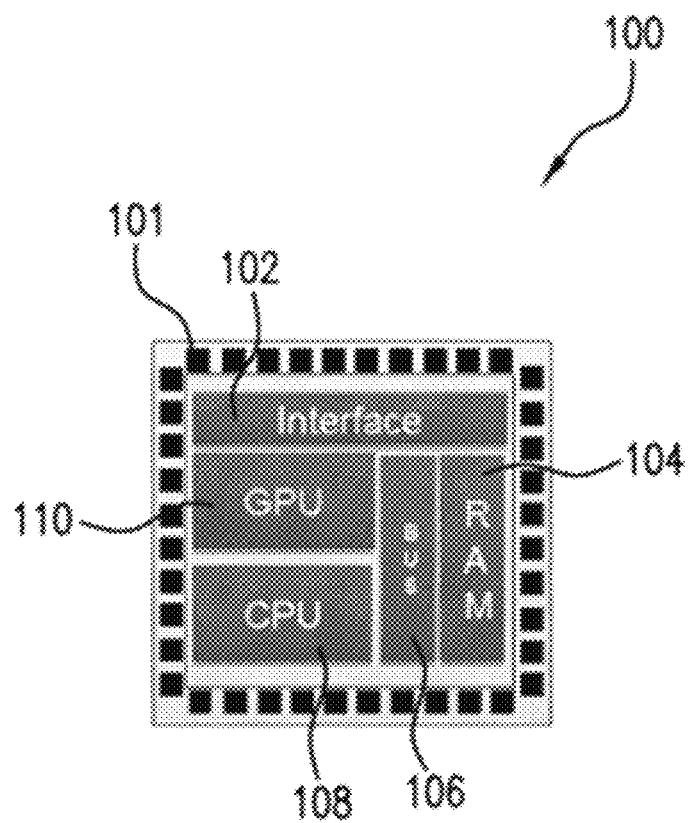
FIG. 1D is a simplified block diagram of an exemplary circuit design representing a processor-based system on chip (SOC) IC product.

As seen in the illustrative block diagram of FIG. 1D, a simplified exemplary circuit design 100 of a SOC includes a plurality of interface pins 101, interchangeably referred to herein as pins, terminals, nodes, ports, and the like. Additionally, a central processing unit (CPU) 108 is coupled via a bus 106 to a memory module 104, shown as a random access memory (RAM). The CPU 108 is additionally coupled to a graphics processing unit (GPU) 110 and the circuit design 100 also includes an interface 102 meant for interfacing with external peripherals and hosts. The exemplary circuit design 100 is merely a highly simplified graphical representation of an exemplary system on chip design. The actual circuit design may comprise potentially tens to hundreds of millions of instances where each instance may be defined by a plurality of logical gates or components, such as AND, OR, NOR, XOR, gates and the like, arranged upon a semiconductor substrate to implement a plurality of logical functions such as, for example, an adder, arithmetic logic unit (ALU), floating point unit (FPU), and the like. While FIG. 1D shows a highly simplified graphical representation of the circuit design, such circuit design may include a plurality of different data abstractions such as a logical representation (also referred to as a schematic), which maintains a qualitative component list and interconnections between these components and some degree of connectivity information. Additionally, a physical implementation abstraction (also referred to as a layout) includes a fully fleshed-out, elaborated, placed and routed representation of the circuit design. The physical layout generally includes an actual coordinate-mapping of absolute physical locations of all of the components of the circuit design onto a semiconductor substrate and specific geometric dimensions thereof compared with merely relative locations in a logical schematic. Additionally, interconnective routing and the exact paths for electrical impulses and signals to follow between components throughout the circuit design are also fully detailed within the physical layout.

To recap, as seen in FIG. 1, an exemplary EDA flow is shown. A circuit design starts with a design idea at block 10 which may be a seed of a design conceived by a team of circuit designers to address a need or necessity. Such logical schematic of the circuit design more fully elaborates a designer's idea and seeks to capture the abstracted logic and qualitative properties required to implement the idea. Once a logical schematic has been completed, flow proceeds to block 30 where routing, component placement and timing, parasitic optimization is performed to arrive at an optimum (or at least workable) arrangement amongst a silicon substrate housing the plurality of components to meet a plurality of design rules, constraints, and goals while at the same time faithfully reproducing the logical functionality of the logical schematic created at block 20. Between blocks 40 and 50, a repetitive iterative loop of performing static timing analysis signoff on the circuit design at block 40 and optimizing the circuit design at block 50 in a transformative manner to remedy timing defects is exhaustively performed. Once the repetitive loop between signoff and optimization has completed, the circuit design, such as, for example, seen in FIG. 1D is then fabricated into a physical, tangible, and operable product defined by the circuit design data.

The signoff static timing analysis is performed whereby exhaustive timing tests are performed on the circuit design to ensure that everything is correct and will work as desired. This stage is somewhat like a checksum stage where an input is provided to the circuit design and an output is expected at a certain time. However, this timing analysis is run exhaustively and in atomic detail on each and every gate, component, and/or path throughout the entirety of the circuit design. Generally, the timing analysis and the timing signoff is performed not only once for the design, but a plurality of times, once for each representative view of the circuit design where a view is a unique permutation of corners and modes of operational corners and modes. Therefore, the timing signoff is generally a very time, processing, and memory intensive process.

As seen in FIG. 1A, a battery of disparate static timing analyses are performed on the circuit design to arrive at a hybrid operational timing characteristic database of the circuit design incorporating the plurality of heterogeneous timing analyses performed thereon. As seen at block 10, a plurality of circuit timing analysis inputs is gathered for the circuit design. As an example, a gate level netlist definition of the circuit design may be loaded whereby each pin or node of the design is accounted for and a topological depiction of the relation amongst other pins, nodes, or gates is presented. Additionally, timing constraints may be input into the static timing analyses. At block 20, a GBA STA on the circuit design is performed according to the inputs to generate a GBA timing database for the circuit design. The graph-based analysis has a number of defects or shortfalls that make accurate timing analysis of the circuit design very difficult. For example, to manage the length of time or runtime of the analyses, the graph-based analysis is performed in an abbreviated manner whereby each exhaustive path between components may not be evaluated and characteristics thereof retained, but merely a worst-case amongst inputs may be evaluated for a multi-input component. Additionally, a number of other factors contribute to making the GBA analysis one which is executable in a manageable portion of time with results which may not be accurate, but are biased towards finding a violation--even where one may not actually exist.

The GBA analysis propagates throughout the circuit design and creates a timing database of actual signal arrival times subtracted from required times (defined by constraints at each circuit node), whereby it is determined that the constraint based required time for a signal to arrive and depart a gate, pin, or node, minus the actual arrival time, results in a timing violation if the result is negative, meaning that the signal arrives later than when it is needed. Such a timing violation is referred to as a negative slack. A number of constraints may be placed on a circuit design, such as, for example, requiring a certain signal to arrive at a certain time. Therefore, a required time of arrival herein may be considered a constraint, and an actual arrival time of a signal may be evaluated against the constraint or required time to determine whether the constraint is met. If a signal arrives at a certain time less than the required time, then a timing slack may exist meaning that the signal arrived with an additional slack or tolerance and still meet the constrained time. Therefore, a slack may be defined as the required time minus the arrival time. A negative slack however indicates that a signal did not arrive within the required time, but instead arrived at a time after the required time and therefore the constraint was not satisfied. In such regard, the failure to meet a constraint, such as, by a negative slack, may indicate a timing violation or defect in the circuit design.

As seen in block 50 of FIG. 1, the circuit is optimized to remedy detected timing defects (such as described above), by, for example, the addition of gates, subtraction of gates, or resizing of gates, amongst other remedial actions. As seen in block 20 of FIG. 1A, the GBA STA is exhaustively performed on the circuit design according to the inputs to generate a GBA timing database thereof. The timing database keeps track of each node such as AND gate 1 pin A, AND gate 1 pin B, AND gate 1 pin Y, and the like, and a respectively corresponding required time and arrival time, or merely a slack or negative slack time, where a negative slack generally indicates a timing violation. A positive slack value or arrival within a required time indicates a certain amount of slack, tolerance, or leeway when changing or transforming the circuit design to accommodate timing violations. Accordingly, positive slack nodes may be adjusted to lighten the load on the timing violating pins.

Upon completion of the static timing analysis, preferably a GBA analysis, the timing database may be evaluated to identify at block 30 a set of candidate endpoints for re-evaluation based on a predetermined set of factors, including the GBA operational timing characteristics of those endpoints. The predetermined set of factors may also optionally include violations or negative slacks, likely slew or arrival pessimism, AOCV variations, Signal Integrity (SI) characteristics, magnitude ranked critical violations, various additional likely sources of pessimism, and thresholding. For example, if a signal was to arrive at AND1/A (AND gate 1 pin A) at a specified time such as, for example, 0.58 nanoseconds and the signal actually arrived at that pin at 0.2 nanoseconds, then a resultant 0.38 positive slack time may be recorded in the timing database. Conversely, if a signal was to arrive at the AND gate pin Y at 0.1 nanoseconds, and the signal arrived at 0.5 nanoseconds, the slack would be a -0.4 nanoseconds, thereby indicating a timing violation with the signal arriving at the AND1 gate pin Y (required time minus actual arrival time=slack time). Once every node of the circuit design has been evaluated based on its operational timing characteristics and a GBA timing database containing each of those nodes and their respective operational timing characteristics has been generated, the database may be sorted according to the magnitude of the slack.

If a circuit design or a path through a circuit design is thought of as a chain and the greatest magnitude or most critical of the timing violations in the path, or circuit design, is considered as the weakest link in the chain, then it can be seen that fixing or remediating the most severe of the timing violations or weakest links in the chain will provide the greatest benefit for the overall circuit design. The ranked timing database for each node or endpoint is evaluated to determine the top N set of violating or critical nodes. The N or quantity of such top N may be based upon a determination of an acceptable runtime. For example, if a design shop has a week to run the circuit timing analysis, then perhaps all timing violations may be addressed in the circuit design. However, if suitable runtime is not available, then perhaps a certain threshold of the most severe or most critical timing violations may be addressed while the remainder are not. The remainder would still have to be passed on to the optimizer for remedial transformations thereupon which is less than ideal. Once the targeted candidate endpoints have been determined, a set of paths at block 40 are identified in the circuit design respectively corresponding to the identified endpoints thereof.

The set of paths identified as containing the critical or highest-ranked timing violation containing endpoints is then passed on at block 50 to a path-based static timing analysis (PBA STA) which performs a PBA only on the enumerated paths from block 40. Whereas the GBA style analysis chose a worst-case path through a multiple input gate, the path-based PBA analysis evaluates all of the timing characteristics of all of the paths separately entering each multi-in gate logic and does not discard actual path characteristics such as by merging the slacks or slews thereof, but instead maintains a comprehensive listing of the different paths even through a single gate. Such PBA analysis thereby removes pessimism introduced by the GBA analysis towards a more realistic timing database to guide the optimizer and reduce corrective loops and unnecessary additional gates.

At block 40, a set of paths corresponding to or containing the set of candidate endpoints or violating nodes are identified. At block 50, a PBA is selectively performed on nodes in the identified set of paths at block 40 to thereby re-evaluate timing characteristics at the nodes thereof and write the re-evaluated timing characteristics into a PBA database or datastore with a reduced pessimism relative to the GBA timing database.

At block 60, the GBA timing database is opened and the PBA database or data store is opened, the nodes in each are correlated, and the PBA values are selectively copied from the PBA timing database into the GBA timing database to replace the overly pessimistic or inaccurate GBA timing operational characteristics of each reevaluated gate with a more accurate or more realistic PBA operational timing characteristic thereof. Thereby, with the selective replacement of GBA values with PBA values in the top N selected critical endpoints or paths, a hybrid GBA/PBA database or operational timing characteristics of the gates is established. The hybrid GBA/PBA operational timing database or data store will be passed to the optimization engine which is configured to receiving purely GBA timing databases. At block 70, timing conflicts between GBA and PBA values, such as at multi-input fan-ins of combinational logic are determined. If, for example, a fan-in has a higher magnitude more critical timing violation than a fan-out line of, for example, an AND gate, then an inconsistency in the timing database may be said to exist. Additionally, if an upstream node along a path has a higher magnitude timing violation than a downstream node along a path, then another timing inconsistency may be said to exist in the timing database. Such inconsistencies may be determined by identifying slack for a node in relation to other slacks of other nodes along the path. For example, the consistency checker may start at a first node, record the slack, traverse to an adjacent node and compare its slack with the recorded slack.

At block 80, the reconciled hybrid GBA/PBA database is passed on to the physical implementation optimizer to transform the circuit design according to the timing violations extant in the hybrid GBA/PBA database. The optimizer will selectively insert additional buffers or other such gates or constructs to increase the delay, delete buffers or unneeded logic to reduce delay, or resize gates larger to increase additional delay or smaller to reduce delay across the gates. In such manner, the physical implementation optimizer thereby addresses and accordingly remedies identified actual timing violations in the hybrid GBA/PBA database. Upon completion of optimization at block 80, a final signoff is performed to ensure no timing violations exist and the circuit design is passed off for physical fabrication thereof. With the hybrid PBA/GBA timing database, the final signoff should be performed once all timing violations have been mitigated or removed with a PBA-based signoff such that the additional pessimism inherent in the GBA analysis is not re-introduced. Otherwise, a GBA-based final signoff following timing violation remediation may introduce false positive violations where no violations actually exist, but are due solely to the introduced pessimism in the GBA signoff tool.

Discussing block 10 of FIG. 1A in greater detail, FIG. 1B shows some exemplary inputs which are gathered at block 10 of FIG. 1A. The gate-level netlist definition of the circuit design is gathered at block 102. The gate-level netlist definition defines each gate and a topological structure relating each gate to another gate along a series of predefined paths through the circuit design. For example, it may be seen that input 1 is connected to pin A of AND gate 1. At block 104, a standard cell timing library is imported or gathered for the circuit timing analysis. The standard cell timing library may have a plurality of pre-computed or predetermined delay values across each cell within the circuit design. For example, it may be known that a particular AND gate has a certain delay of 5 nanoseconds across an A and/or B input to the Y output pin thereof. At block 106, a global On Chip Variation (OCV) and/or local (object specific derate factor), depth, and/or distance-based Advanced On Chip Variation (AOCV) timing derate factor translation is imported. In a GBA style analysis, a global timing derate factor, such as, for example, 1.18 is applied promiscuously across all nodes of the circuit design. Such promiscuous application of the global timing derate factor at block 106 may lead to overly pessimistic results and, accordingly, in a PBA style analysis, an actual depth, stage count, timing arc, or phase is counted for the length of each path and a length or depth-based AOCV is applied based upon that length. For example, a path of four timing arcs may have a specific value such as 1.28 global derate, whereas a stage count of 1 may have an AOCV derate factor of 1.01 to be applied to the operational timing characteristics thereof.

At block 108, the parasitic data for interconnections is imported. The parasitic data may include intercoupling effects and other effects such as electromagnetic interference (EMI), parasitic intercoupling, capacitive intercoupling between interconnect wire segments, resistances, and capacitances, and the like to evaluate delay across interconnects. At block 110, a SDF or SPEF may, optionally, be imported where the delay for certain gates is predefined and at block 112, certain timing constraints defining the required arrival time of a signal at a particular gate are predefined. Arrival times for gates are determined in relation to the timing constraints or required times for each gate to determine a slack value for each node in the circuit design. Other than netlist 102, every other input may vary per analysis view (delay corner+constraint mode). For example, at different Process, Voltage, Temperature corners of the STA analyses, different AOCV, parasitics, delay library values, and/or timing constraints may be employed. A set of input constraints may be applied which define the desired timing that is envisioned from the circuit design.

As seen in FIG. 1C, the gate level netlist definition of the circuit is incorporated in section 101 into the static timing analysis 109. The standard cell timing library 102 may also be incorporated into the static timing analysis 109 to build a persistent model of the circuit design such as a timing graph where each component is a node and each interconnect is a path segment between nodes. Additionally, derating factors at block 103 are incorporated into the static timing analysis 109 as well as parasitic data 104, standard delay format data 105, and constraints or requirements at block 106. After the data inputs 101-106 are inputted to the static timing analysis 109 (which may be a GBA or PBA based analysis, or the like), a persistent model of the circuit design is built to include all of the data elements 101-106. The static timing analysis, such as the GBA or PBA analysis, is executed to run on the persistent model of the circuit design which outputs additional standard delay format (SDF) output at block 108 and timing reports 107, such as a GBA timing database to be used in further analysis and violation remediation downstream, such as in the optimizer.

In some embodiments, the term "netlist" may refer to a model that defines the digital circuit that is being envisioned. Generally, a gate level netlist is provided as an input model to define the desired functionality. Various types of library models may also be required to perform static timing analysis. Some of these may include, but are not limited to, Liberty format specified .lib library models for defining the delays of standard digital gates (AND, OR, NOT, FLOP, LATCH etc.) and MACROS, AOCV models for performing advanced STA, CDB models for performing SI analysis, etc. STA may also include parasitic input information. Similar to gates, for interconnects also there exist models which are generally specified in the Standard Parasitic Exchange Format ("SPEF"). Timing Derates are a means to model the variation impact generally during STA. The standard delay format ("SDF") is another means of specifying the inputs delays of gates and interconnects. System level constraints generally include a set of input constraints are applied which define the desired timing that is envisioned from the digital circuit under consideration.

In some embodiments of the present disclosure, STA may include a set of timing reports that classify the entire electronic design into various number of paths (e.g., subsections of digital circuits) and then state whether each path is meeting the set constraints. These timing reports may include both GBA and PBA. In GBA, after reading inputs, the first step that happens is building a persistent model of STA. In this way, a timing graph may be generated internally for the given netlist and then the worst arrival and required times on the nodes of the graph may be computed. For certain nodes which may be characterized as endpoints, it also computes the worst slack. PBA may function as an extension to GBA and may be used to target pessimism reduction (and optimism also in certain cases where GBA today cannot cater to the requirements like waveform propagation due to compute and resource intensive tasks) that has been introduced at various stages of GBA. Various types of pessimism introduced during GBA analysis may include, but are not limited to, slew merging pessimism impacting delay computation on the timing network, graph based derating factors (advanced on-chip-variation factors), and signal integrity (SI) effects.

In some embodiments, after reading inputs, the first step may include building a persistent model of STA. Accordingly, a timing graph for the given netlist may be generated and then the worst arrival and required times on the nodes of the graph may be determined. For certain nodes which may be characterized as endpoints, the worst slack may also be computed. As discussed above, FIG. 4 depicts an example flowchart showing some of the operations that may be involved in the generation of timing reports (e.g. for both GBA and PBA).

In some designs, multiple sources of pessimism in GBA leave no choice but to use PBA as their criteria for sign-off. However, one of the major sign-off problems with PBA is ensuring that the designer has uncovered all of the possible failures in the design. With increasing design sizes and complexity, this is a challenging task as it is often marred with capacity, performance, time to market, and power and area (PPA) challenges.

Software implementation methods for technologies like AOCV, slew merging, voltage changes and statistical on-chip variation ("SOCV"), statistical timing analysis ("SSTA"), pessimism in timing analysis and signal integrity (SI) continue to add additional complexities as they significantly increase GBA—PBA gap. Due to these limitations, slack wall invariably contain millions of violating GBA slack paths even during the final sign-off stages. Often there are certain specific endpoints which potentially have a high nworst coverage (e.g., millions of path leading to that endpoint) and this complicates things further for PBA.

While exhaustive PBA methods exist, true worst path identification in these existing PBA systems is extremely time intensive due to the issues described above. The problem of guaranteeing worst path is marred with intractable runtimes. To circumvent these performance issues, software can place limits for performing depth search, however, that leads to inaccuracies. It also leads to incomplete coverage of the design which acts as a deterrent to sign-off using PBA since violations tend to spread out in the various logic cones of the designs. Thus, with high numbers of endpoint violations and significantly large depth search space, it may be nearly impossible to provide full design coverage.

Another problem is that existing tools do not have all the designer knowledge modeled into the software so there is a need to have path handles that users can utilize to filter irrelevant paths. While software has evolved significantly to model designer knowledge to some extent, the gap is wide and every design potentially is different and may need specific tuning for better performance. In situations where many paths are failing, having a means to filter out certain paths that the designer may want to exclude for various reasons may significantly boost performance.

Figure 2:
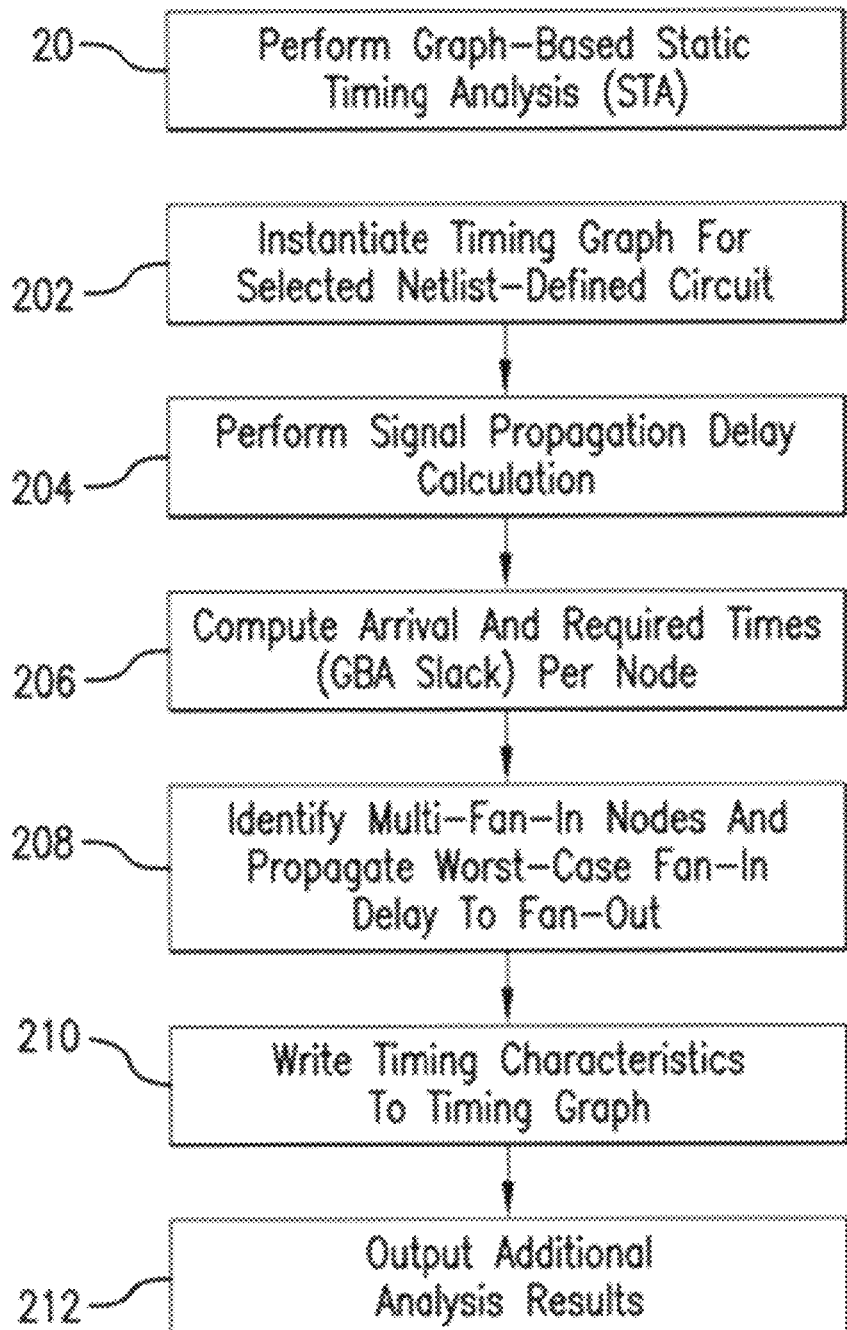
FIG. 2 is a flow diagram illustrating an exemplary flow through a graph-based static timing analysis (GBA STA)

As seen in FIG. 2, an exemplary GBA STA is performed. At block 202, a timing database is instantiated for the selected netlist-defined circuit. In other words, a timing database is created, memory is reserved for it according to the netlist-defined circuit, or the topology along with the gates having interconnect sets defined in the netlist data. Flow proceeds to block 204 where a signal propagation delay calculation is performed to determine arrival of required times for each node throughout the netlist-defined circuit design. At block 206, arrival and required times are computed for each node to determine the GBA slack where slack is the required time minus the arrival time.

At block 208, multi fan-in nodes, such as, for example, an AND, OR, and NOR gate are identified. The multiple fan-in nodes of a logical gate such as the AND gate are compared one relative to the remainder to determine the worst possible delay and slew operational timing characteristics thereof. The delay and slew from the worst possible multiple fan-in is then propagated downstream to the fan-out of the logic gate containing the multiple fan-in nodes. In such manner, a worst-case analysis is performed and the output gets the absolute worst potential input thereto. While such approach incorporates additional pessimism vs. accuracy, if the worst possible fan-in meets the timing requirements or constraints, then it can be assumed that the remainder of the fan-in nodes also meet the timing requirements or constraints thereupon and computation time, size, and expense may all be correspondingly reduced--though increased pessimism is introduced. At block 210, the operational timing characteristics determined for each node based upon the parameters of the GBA static timing analysis are written to the timing graph or database instantiated at block 202 to thereby generate a fully populated GBA timing data base for the entirety of the netlist-defined circuit design. At block 212, additional analysis results from the GBA STA may be outputted for other peripheral uses by circuit designers, signoff engineers, and other downstream processors.

Figure 3:
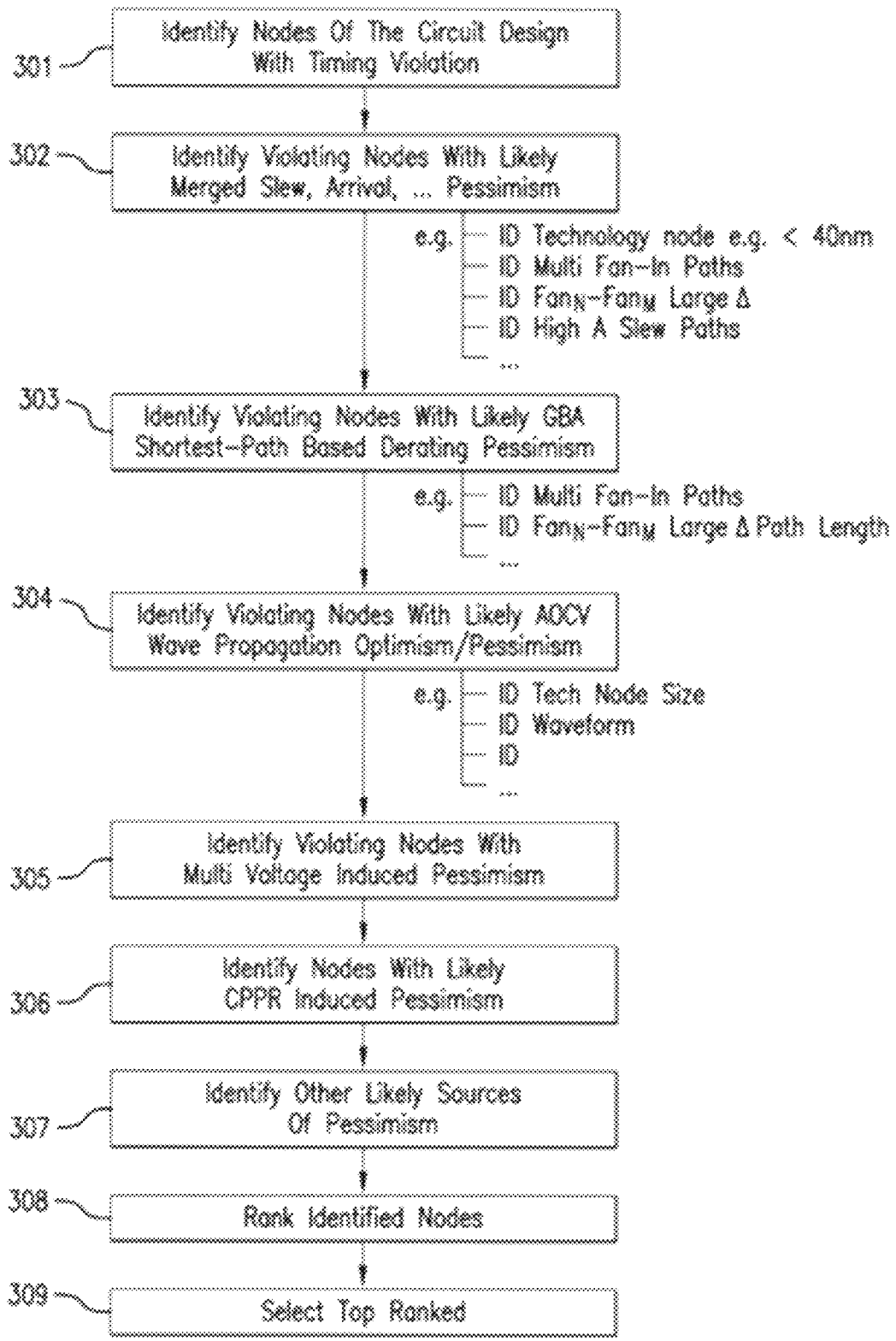
FIG. 3 is an exemplary flow in an alternate configuration for identifying a set of candidate end points for timing reevaluation thereof.

As seen in FIG. 3, an exemplary alternate approach for determining timing violations having reducible pessimism in the GBA timing database is disclosed. At block 301, the nodes of the circuit design with timing violations thereof are identified as a subset of the universe of nodes in the GBA timing database. At block 302, nodes with likely merged slew, arrival time, or other merged timing characteristic based pessimism determined in the violating nodes are determined or identified as well. Nodes with likely merged slew pessimism may be determined by firstly determining technology node size, such as, for example, less than 40 nanometers, or less than 28 nanometer feature size or transistor length. Above 40 nanometers, the actual slew waveform (the time for a signal to traverse from a 0 state to a 1 state or a 1 state to a 0 state) may be summarized, but below the 40 nanometer size, the actual waveform or slew rate has a noticeable impact upon delay, and therefore, a predetermined set of points, approximating the curve or curve-matching the actual waveform, is selectively employed in a PBA analysis to reduce pessimism inherent in the GBA analysis. Therefore, technologies above 40 nanometers may not need to be targeted for use of the higher accuracy point-set slew analysis as opposed to a simple ramp angle slew analysis.

Additionally, merged slew pessimism introduced in the GBA is seen to only occur at multi fan-in paths and so the merge slew pessimism PBA tool may be selectively employed where it is determined that the technology node is below 40 nanometers, a particular path has a multi-fan-in gate, and other such factors. Merged arrival time pessimism is also a likely source of pessimism inherent in GBA analysis, amongst other merged or worst-cased/best-cased operational timing characteristics.

At block 303, the subset of likely GBA shortest-path and de-rating based pessimism subset is formed of the identified violating nodes from the GBA timing database. Several factors may go into determining these likely candidates for reduction of GBA pessimism through selective target application of the PBA analysis. For example, shortest path-based derating pessimism occurs only on multi-fan in paths and the potential for pessimism reduction may be determined by subtracting the individual lengths of fan in inputs, where for example, fan.sub.m-fan.sub.n has a large delta of path length determined by timing arcs, phases, stages, or the like. By identifying likely candidates for pessimism reduction, the PBA may be selectively employed without a promiscuous application thereof which would be unwieldy in terms of processing, storage, temporary storage, and the like.

At block 304, violating nodes with a likely AOCV wave propagation pessimism induced in the GBA analyzer are identified to selectively target the PBA analyzer against those portions of the circuit design. At block 305, violating nodes with a multi-voltage induced pessimism from the GBA analysis are identified for likely reevaluative action in the PBA analyzer. At block 306, nodes with likely common path pessimism may be targeted for common path pessimism removal (CPPR). At block 307, additional nodes likely to have introduced pessimism are selectively targeted. At block 308, the nodes identified with likely pessimistic inaccuracy are ranked according to criticality or magnitude of the timing violation. For example, the higher the negative slack, the more critical, and the more likely PBA reevaluation will be effective at reducing pessimism therein. At block 309, the top ranked of the identified nodes at block 308 are selected for a targeted surgical PBA analysis thereof. The top ranked may be selected considering the design coverage (such that optimal timing database may be generated) for violating network though this may be user tunable.

As discussed above, a plurality of different PBA configuration modes or flavors may be concurrently employed across a plurality of processors, cores, or systems for remediation of the GBA induced pessimism therein.

Figure 3A:
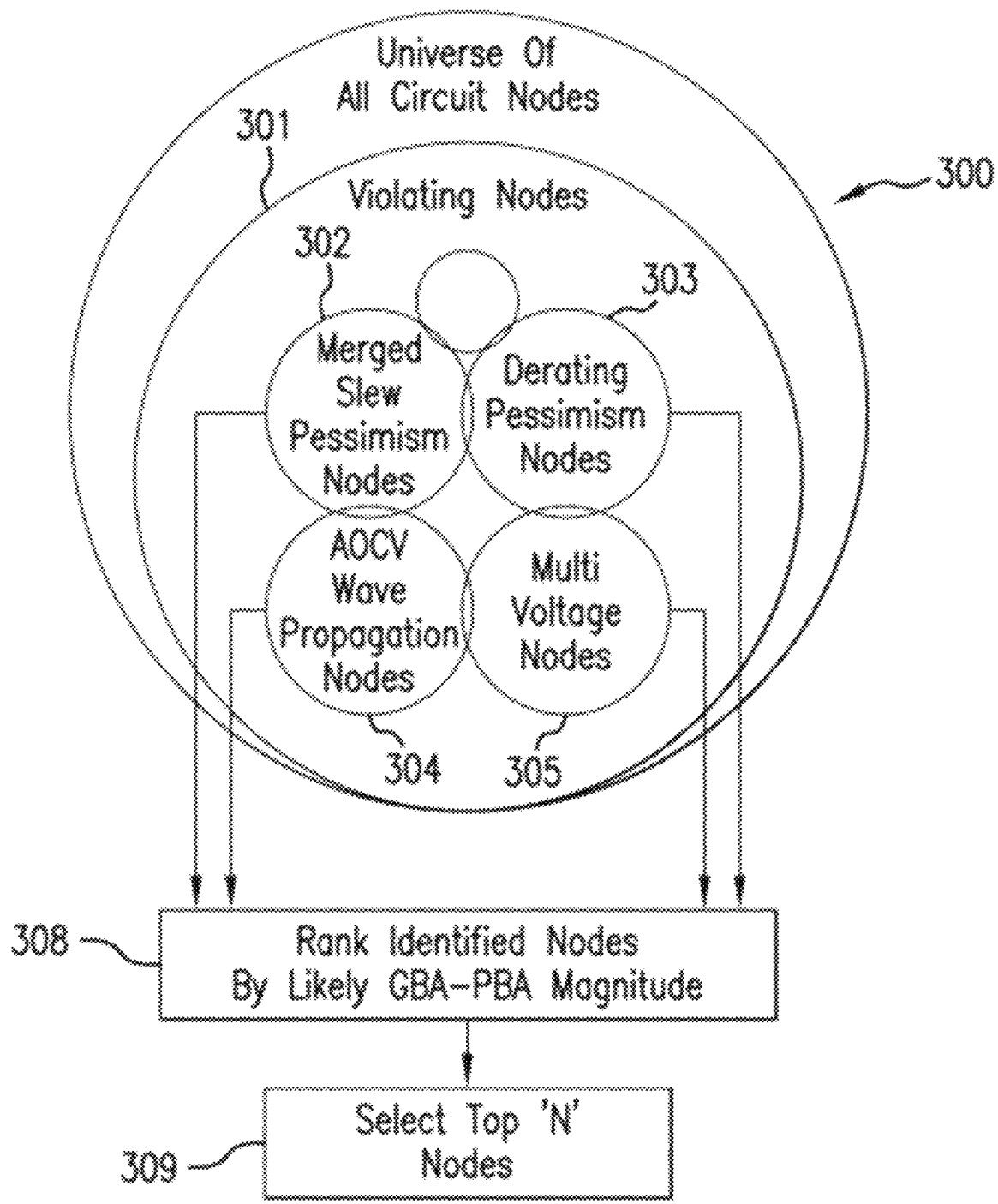
FIG. 3A is an illustrative block diagram illustrating an alternate flow for determining a set of candidate end points for timing reevaluation thereof.

As seen in FIG. 3A, an exemplary Venn diagram is shown of violating nodes with likely GBA induced pessimism affecting the accuracy or realism of the operational timing characteristics recorded in the GBA timing database. The universe of all circuit nodes defined in the netlist data input in FIGS. 1B and 1C are shown. The violating nodes 301 form a subset of the universe of all circuit nodes 300 of the circuit design according to the netlist input to build the persistent circuit design model. The violating nodes 301 form a subset of the universe of all circuit nodes. For example, if the universe of all circuit nodes is 100 million nodes, the number of violating nodes may have a varying value depending on the stage of the circuit design, but towards the end may have a manageable number such as 3,000 to 5,000. Some subset of the violating nodes 301 that may have a greater likelihood of pessimism or inaccuracies due to the conservative nature of the GBA include those nodes with a likely merged slew pessimism at block 302, nodes with a likely de-rating pessimism 303, multi-voltage nodes 305, and AOC wave propagation nodes 304, amongst other overly pessimistic nodes according to the algorithms employed and configured settings of the GBA analysis. All of the subsets of violating nodes with likely potential for pessimism reduction are identified and ranked at block 308 by criticality or magnitude of their respective timing violation, or by the likely magnitude of potential pessimism reduction when employing a PBA based analyzer upon the identified nodes. At block 309, the top N nodes are selected by criticality, by the likely gains in the PBA based analysis, or considering the design coverage (towards generating an optimal timing database) though this may be user/designer tunable.

Figure 3B:
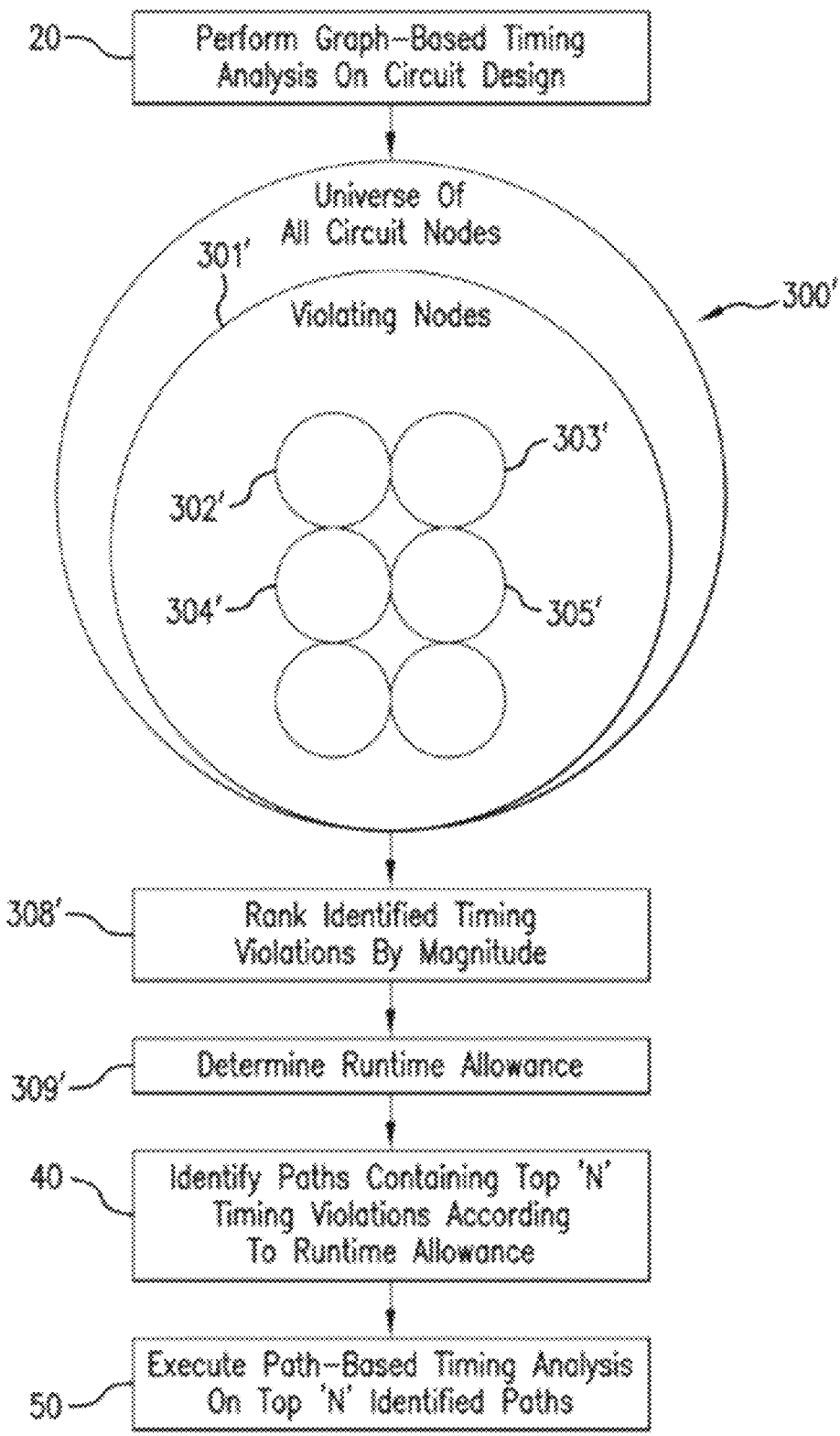
FIG. 3B is an exemplary flow diagram of a preferred embodiment for determining a set of end points for reevaluation thereof with a path-based timing analysis tool.

FIG. 3B shows another embodiment, wherein at block 20, a graph based timing analysis (GBA) is executed to analyze the circuit design. The timing report output, as seen in block 107 of FIG. 1C produces a timing report with a universe of all circuit nodes in the circuit design as defined by the netlist input at block 101 of FIG. 1C. The universe of all circuit nodes 300' includes a subset 301' of nodes which violate the timing constraints input in FIG. 1C. The universe of violating nodes 301' may have subsets thereof, such as subsets 302', 303', 304', and 305', which may be candidates with a good probability of GBA-based pessimism induced inaccuracies in the timing data ripe for reevaluation. Of the violating nodes 301' subset, such nodes are ranked and identified by their magnitude or criticality defined by the required time arrival time=slack time. Negative slack time indicates a timing violation or a failure to meet a required time or timing constraint imposed upon the circuit design and input in FIG. 1C. A timing violation indicates that the circuit design will not perform as required and needs to be remedied. The subset of violating nodes at block 301' are then ranked at block 308' according to the magnitude of the timing violation thereof. For example, the greatest negative timing slack and would accordingly be the most critical or the highest ranked identified timing violation. For example, if the identified timing violations were AND gate Y at negative 4 slack, AND gate A at negative 2 slack, and gate B at negative 1 slack, the AND gate Y at negative 4 slack would be the highest ranked and the AND gate B with the negative 1 slack would be the lowest ranked slack timing violation magnitude.

At block 309, it is determined what the runtime allowance is for analysis of this particular circuit design. For example, a circuit design team may have one night, one weekend, one week, or the like, to perform or to remove pessimism in the timing analysis. Depending upon the amount of time available, potentially all timing violations may be re-evaluated with the pessimism reduced or removed to thereby reduce or remove unneeded over or under fixing in the physical implementation tool where the timing data will be passed next. Such passing of the various databases herein may be accomplished through any measures known to one of skill in the art, such as by passing a reference, link, location path, pointer, or the like. According to the designers' allowable runtime and the system designer preferences, the number of violating nodes with likely pessimism are selectively targeted.

At block 40, the paths containing the top N selected timing violations according to runtime allowance are identified. Wherein an endpoint of AND1/Y might indicate a path from AND1/A to AND1/Y or input1 to AND PIN A may define a path. Alternatively, a path may be defined by an input 1 to an output 2, a register out to a next register in, and the like. At block 50, a path-based timing analysis is executed upon the top-N identified paths thereof containing the highest magnitude identified timing violations.

Figure 4:
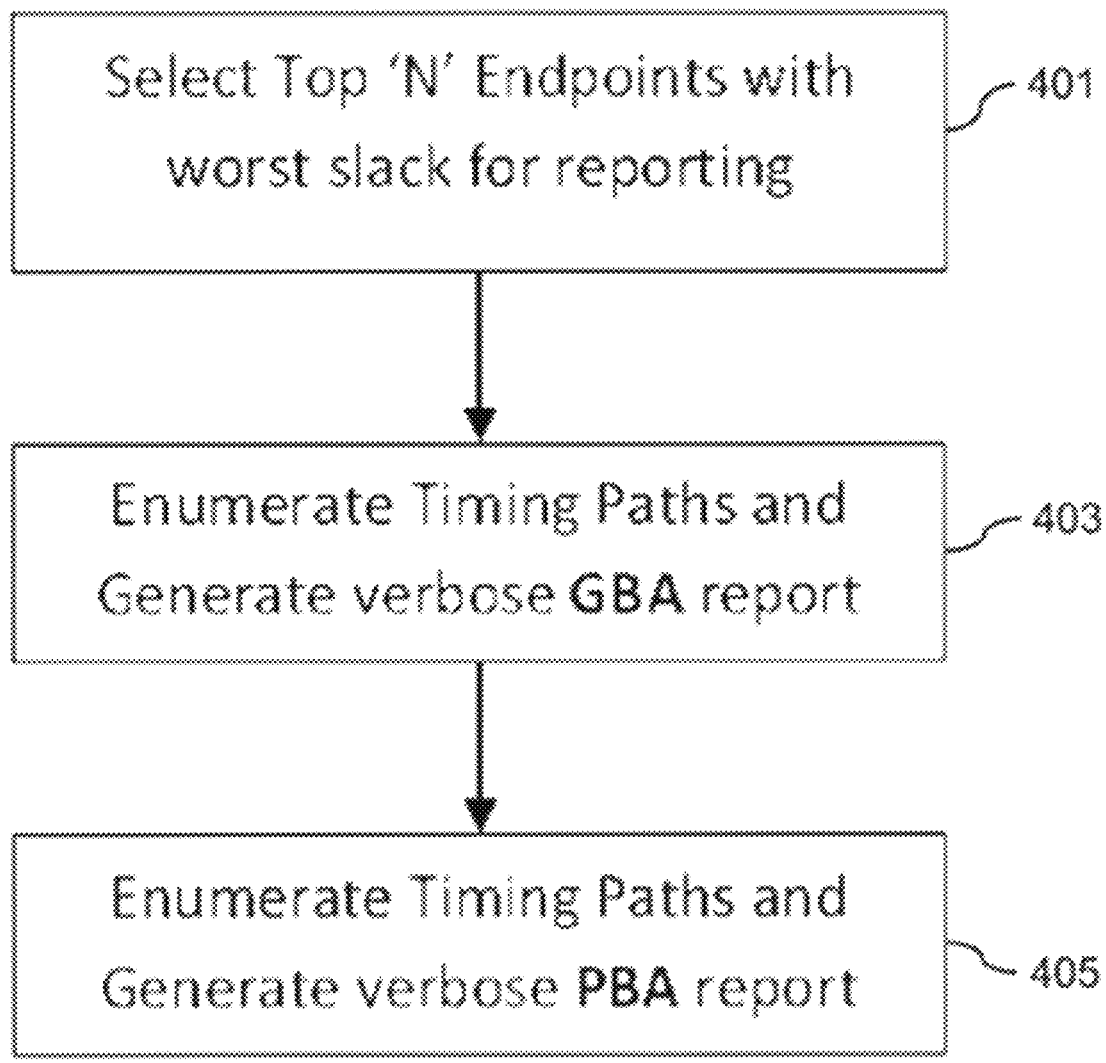
FIG. 4 is an exemplary flow diagram illustrating a flow for performing both graph-based and path-based analysis on a plurality of selected end points.

FIG. 4 is a flow chart showing at block 401 that a top N endpoints with the worst slack are selected for reporting. At block 408, the timing paths are enumerated or identified based on the endpoints thereof and the verbose GBA report is generated, whereby timing values for all of the endpoints within the selected subset of top N end points are analyzed and a corresponding GBA report itemizing a plurality of operational timing characters of N endpoints is generated.

At block 405, the enumerated timing paths are analyzed and a verbose PBA report with enhanced accuracy or realism and with reduced pessimism is generated to be in a report or database timing format.

Referring now to FIGS. 5-16, embodiments depicting an infinite depth PBA (IPBA) process are provided. One of the techniques associated with path-based analysis is referred to as exhaustive path based analysis (EPBA). This technique aims at exhaustively covering all timing paths in the design for PBA. As used herein, the term "failing/violating endpoint" may refer to an endpoint on which there ends at least one path which is failing GBA/PBA slack based on the defined violating boundary value. The term "GBA endpoint-slack" may refer to the worst GBA timing slack on an endpoint. This means there exists at least one GBA path ending at that endpoint having a GBA slack equivalent to the corresponding endpoint slack. The other paths ending at that endpoint, may have a GBA path-slack which may be either equal to or better than the available GBA endpoint-slack (but never worse than that of the GBA endpoint-slack). The term "retimed/PBA endpoint-slack" may refer to the PBA timing slack on an endpoint. This means there exists at least one PBA path ending at that endpoint having a PBA slack equivalent to the corresponding PBA endpoint slack. The PBA endpoint slack may not be the worst PBA slack available on that endpoint, if all the paths ending at that endpoint have not been exhausted and there remain more paths, which may have a worse slack beneath the given path ending at that endpoint. However, if all paths ending at the given endpoint have been analyzed such that there remain no other paths ending at that endpoint, the true worst PBA endpoint slack can be expected to be have been achieved. The term "nworst depth search limit" may refer to a situation where the EPBA looks at each violating endpoint and attempts a certain number of top N worst GBA paths ending on that point. The value N in this case is referred to herein as the nworst depth search limit. This defines the maximum depth of paths per endpoint picked for PBA analysis. The term "max paths search limit" may refer to a situation where EPBA performs a PBA evaluation on a certain number of top N worst GBA paths in the design. The value N, in this example, is referred to as the max paths search limit. This defines the maximum search radius in terms of the maximum total number of paths picked for PBA analysis. The term "phase", as used herein, may refer to a situation where the clocks and the data signals corresponding to every clock are stored and propagated by the software and termed as phases. Broadly, there are clock phase and data phases (corresponding to every clock).

Figure 5:
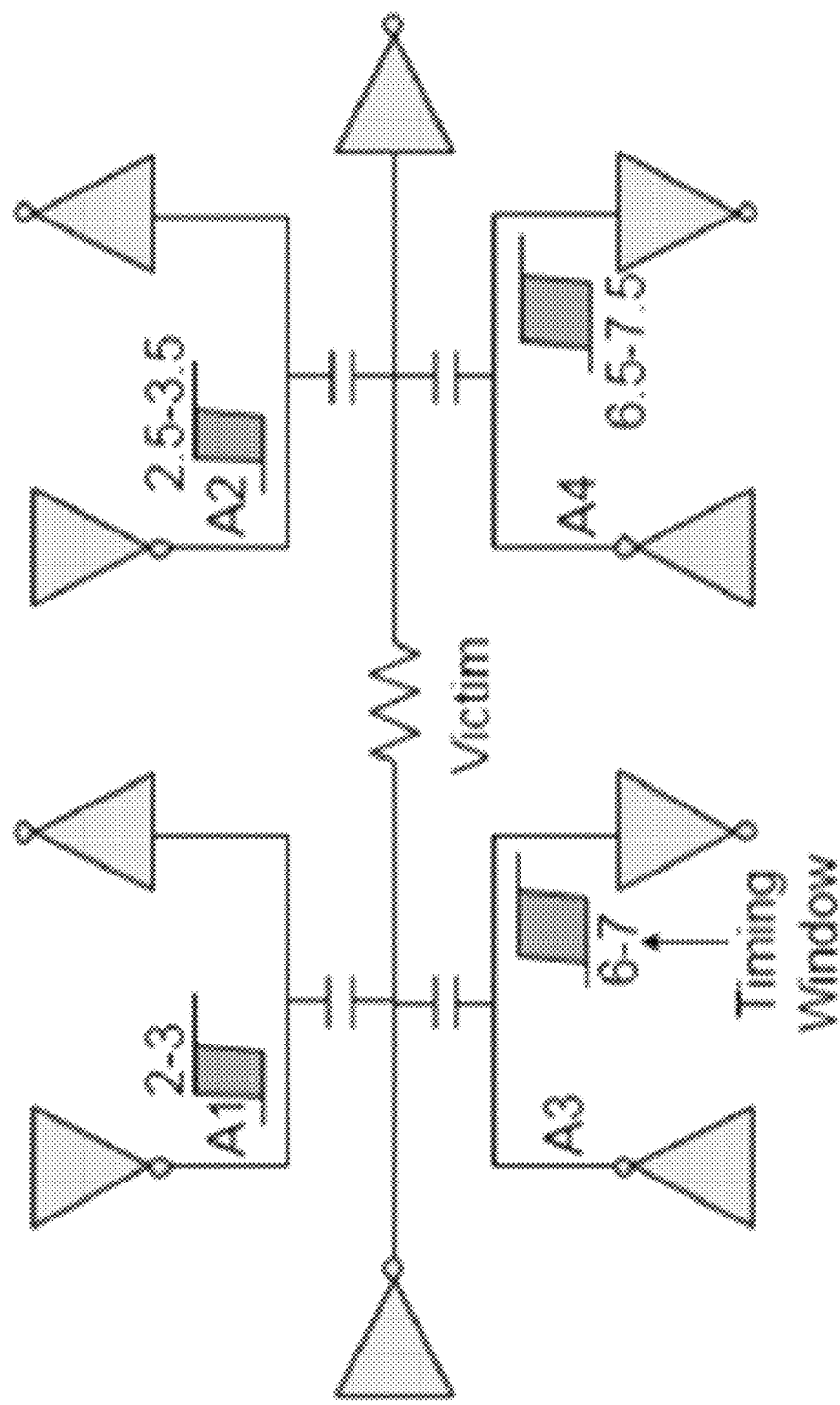
FIG. 5 is an exemplary illustration showing a timing windows example.

CRP refers to a difference in delay along the common part of the launching and capturing clock paths. The most common causes of CRP are re-convergent paths in the clock network, and different min and max delay of cells in the clock network. CRP is considered as a pessimism added timing analysis in general. The pessimism occurs when the analysis tool compares two different clock paths that partially share a common physical path segment, and it assumes the shared segment has a minimum delay for one path and a maximum delay for the other path. Many designers choose to remove this pessimism and this pessimism removal is referred to as CPPR as discussed above. The term "timing window", as used herein, may refer to the earliest and latest possible signal arrival times. In synchronous designs, these signal arrival times are with respect to clock phases. The signal, which may be triggered by a clock phase, will have a minimum possible (earliest) arrival time and a maximum possible (latest) arrival time, when it can transition. Timing windows represent the range of time during which a signal can transition, represented as [minArrival−maxArrival]. The min or max time of this range is referred to as arrival edge. In FIG. 5, for example, the ranges represent the timing windows for respective stages. For A1, the timing window range is 2-3, that is, the time interval in which net/signal A1 can switch.

Figure 6:
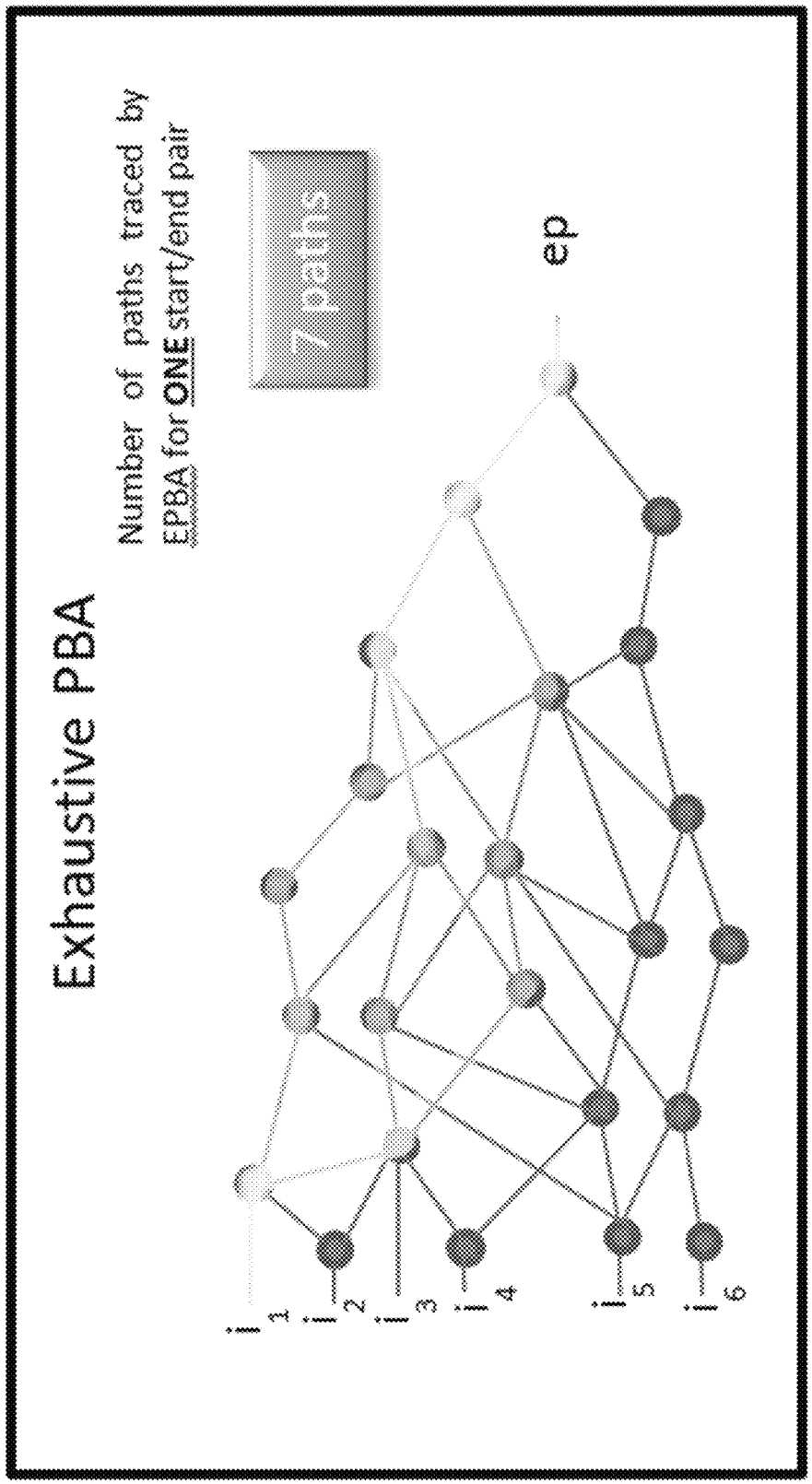
FIG. 6 is an exemplary diagram showing an exhaustive path-based analysis technique.

Referring also to FIG. 6, a diagram showing an example of exhaustive PBA is provided. Exhaustive PBA is extensively employed by users for PBA based timing signoff. Ideally, this analysis technique is designed and aimed at achieving full PBA coverage of all timing paths in the design. As there may be multiple paths having the same endpoint or having the same start point/endpoint combination, this technique is aimed at retiming all the timing paths at every violating endpoint in the design. All the GBA violating paths may be enumerated for PBA analysis up to the defined nworst depth or until all paths to an endpoint have been exhausted. FIG. 6 depicts that there may be multiple timing paths that need to be retimed each corresponding to one start point and that there could be an explosion of timing paths corresponding to every endpoint in the design.

Circuits having complex combinations logic such as adder pipelines or a series of XOR chain-based data path structures have become common day design features. However, having these types of structures in the design may lead to a combinational explosion of timing paths for analysis, optimization and signoff. The quantum of timing paths could pan out to billions of timing paths with many scenarios having millions of paths per endpoint in a design.

With competitive times to market, shrinking technology nodes and multiple sources of pessimism in GBA leave no choice but to use PBA as their criteria for sign-off. One of the major sign-off problems with PBA is ensuring that you have uncovered all possible failures with PBA. With increasing design sizes and complexity, it is very inefficient and nearly impossible to guarantee the same. Existing solutions are only as good as computed PBA data and often are marred with performance, PPA challenges.

PBA helps to remove the timing pessimism added by GBA which propagates the worst case timing across design. Once the GBA analysis is performed, users may select the timing violations flagged by GBA violations and analyze them with the PBA analysis path by path to determine if these paths are still violating after removing the pessimism added by GBA.

As violating endpoints may have several paths to it and to declare the endpoint clean, all paths to that endpoint will have to be analyzed with PBA and their PBA slacks evaluated. As the paths driving the given endpoint are ordered with respect to GBA slacks and not with respect to PBA slacks, it is possible that an Nth path might pass with PBA but an $(N+1)^{th}$ path might still fail. Therefore, it is now established that to ensure that all paths leading to a given endpoint are satisfying timing, it isn't enough to evaluate the first N GBA violating paths as even if they are clean, there might be a case that subsequent GBA violating path continues to violate for PBA slack.

All the timing paths, within the max paths search limit and nworst depth search limit, may be retimed. However, if the max paths search limit or nworst depth search limit has paths/endpoints remaining, no PBA analysis is done on those and such paths cannot be retimed. This is discussed in further detail hereinbelow.

Figure 7:
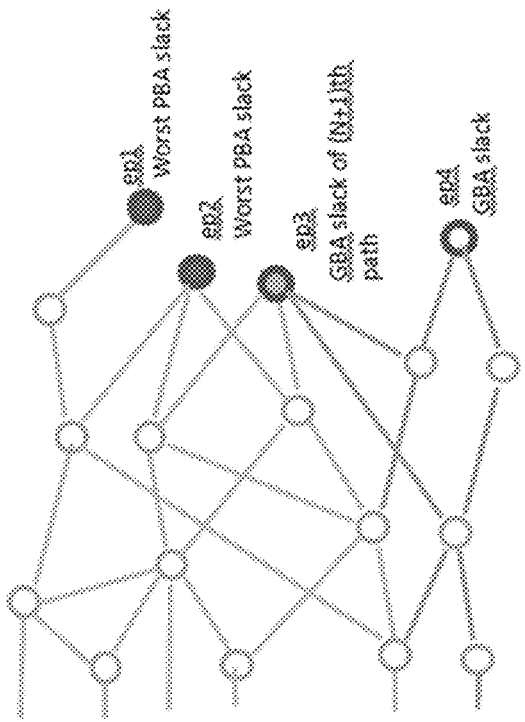
FIG. 7 is another exemplary diagram showing an exhaustive path-based analysis technique.
Figure 7:
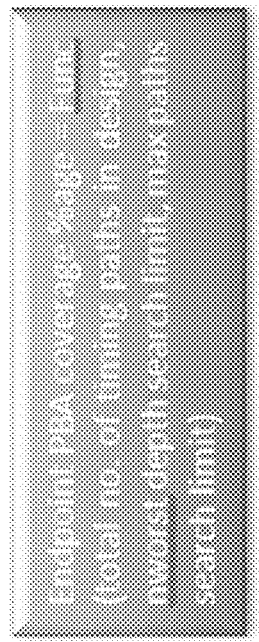
Figure 7:
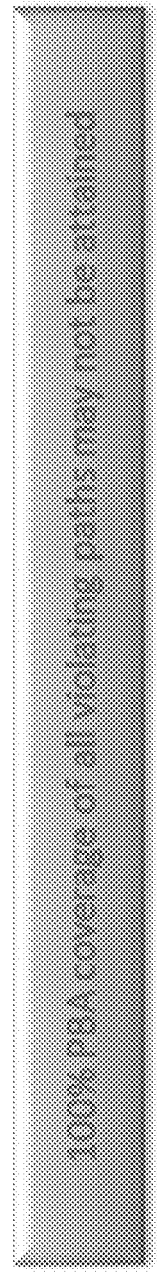

Referring now to FIG. 7, assume for this example that there are 4 GBA violating endpoints (e.g., ep1,ep2,ep3,ep4) having many begin points and multiple timing paths between them. When EPBA attempts to retime all paths, it may become depth-limited and/or runtime-limited. That is, assuming the search limits to have been exhausted such that only endpoints ep1 & ep2 are exhaustively PBA covered with the true worst slack identified for the defined nworst depth search limit. This indicates that endpoint "ep3" could be partially PBA covered so the slack reported on ep3 in this case is the GBA slack of the $(N+1)^{th}$ path, as few paths to that endpoint remain beyond a specified nworst depth limit. And endpoint ep4 may not be covered at all (which could be due to max paths search limit getting exhausted). Therefore, the true worst PBA slack in this example may be provided only for endpoints ep1 and ep2 and many endpoints/paths may not get completely analyzed or analyzed at all for PBA.

Figure 8:
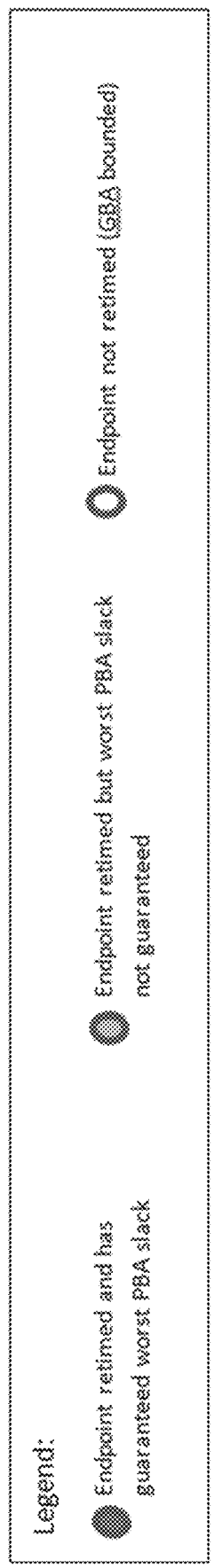
FIG. 8 is a table showing some of the limitations of an exhaustive path-based analysis technique.
Figure 9:
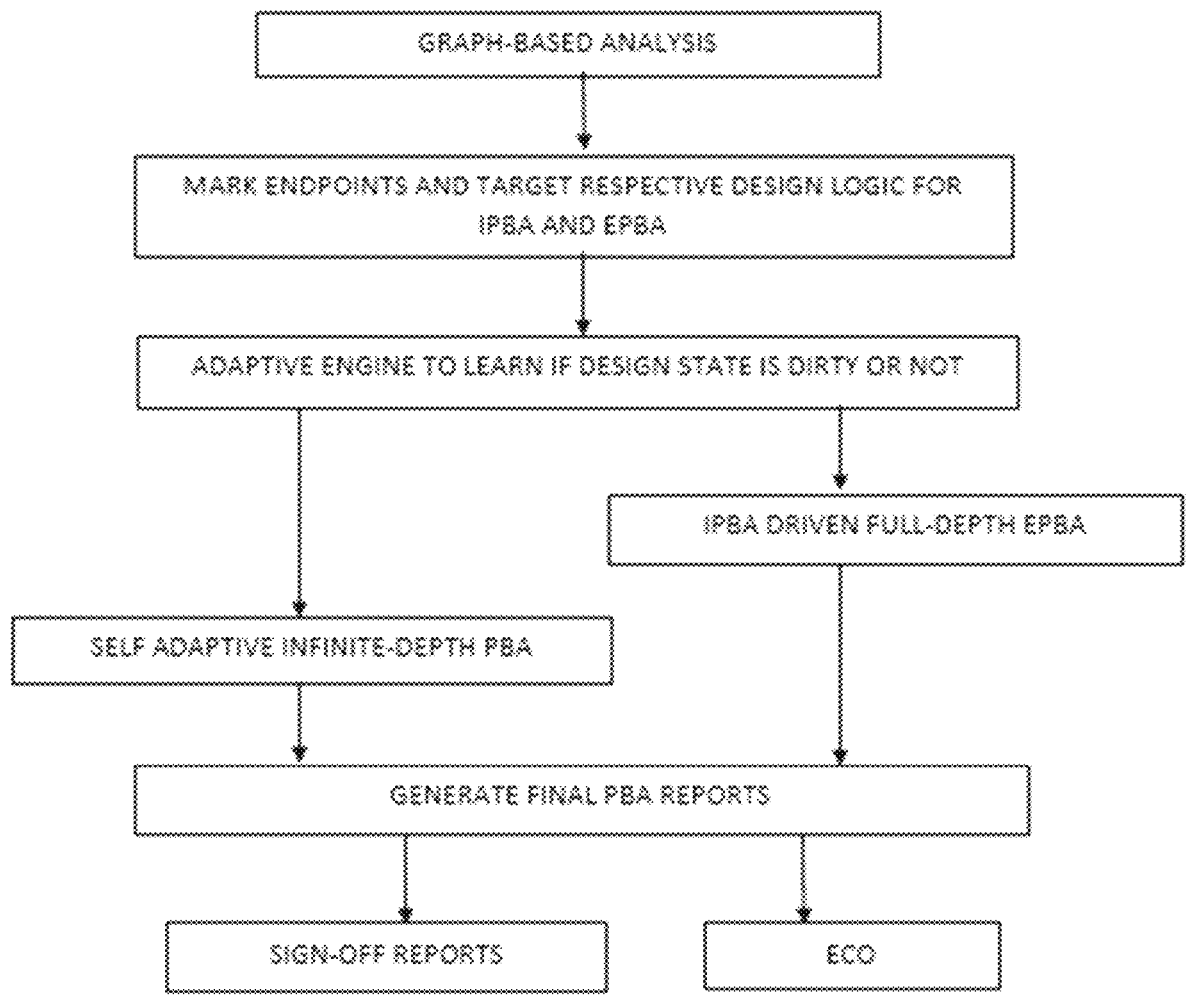
FIGS. 9-12 show example flowcharts depicting operations consistent with embodiments of a self adaptive, infinite depth, path based analysis.

FIG. 8 shows a table depicting some of the limitations of an EPBA technique for path-based analysis. Theoretically, one can keep on using higher and higher depths to let the exhaustive PBA solve the problem of evaluating all of the paths leading to an endpoint and determine if there is a real PBA violation leading to this endpoint. But practically as one keeps on increasing the depth higher and higher, the PBA runtime of evaluating more and more paths continues to increase and eventually it may become unrealistic to evaluate all possible paths to violating endpoints.

Referring now to FIGS. 9-13, embodiments of the present disclosure employ an infinite-depth PBA (IPBA) approach to ensure that all timing violations are covered during exhaustive PBA analysis. Infinite depth PBA provides a solution which is not depth-limited and thereby enables improved design coverages for PBA based analysis, making 100% PBA coverage attainable. This approach addresses the above requirements of evaluating all paths leading to a given endpoint.

A design may have multiple timing endpoints for which STA needs to be performed. Each one of these endpoints might be driven by some part of design logic which in turn will be driven by some of the endpoints. To exhaustively analyze a given endpoint, EDA tools need to analyze all of the timing paths potentially possible from each one of the begin points to this given endpoint. In a complex design with reconverging logic, there may be an infinite number of such paths possible between each one of beginpoint and endpoints. The phrase "infinite-depth", as used herein, may refer to this collection of an infinite number of paths.

IPBA ensures full depth coverage without any GBA bounding pessimism. IPBA analysis is therefore runtime and memory intensive. Considering its higher runtime and memory implications, it is generally recommended to be run when a design is relatively clean and closer to sign-off. Users thus may employ methods in their CAD setup such that there is a trade-off between runtime/memory/capacity and design schedules by employing different flavors of PBA at different stages of the design. This is not only risky but comes with the additional burden of managing flows for different states of designs.

To optimize the sign-off and ECO flow runtime and memory requirements, users are may configure the timing analysis in different modes (GBA/PBA/EPBA/IPBA) as per the design state and custom requirements. Even with different timing analysis modes, there may be sub modes (e.g. max_paths/nworst/group based) that need to be aligned well.

The decision to transition from one analysis mode to another might not be trivial and could be dependent on multiple factors, some of which are discussed in further detail hereinbelow. Design violation state-number of violating endpoints in the design. The higher the number of design violations, the trade-off will be more towards cleaning it first with default PBA. The percentage of violating logic, which indicates how much of design fan-in network is covered within violating logic. If every other nworst path is violating in design, user might not really need exhaustive PBA. The extent of design violations—as it may be the case that the design has significantly higher violations, all sitting close to violation boundary whereas in another case design might have high number of violations with significantly higher violating slacks. Here, the earlier case may be considered for exhaustive analysis where the latter one might be sufficient for default PBA analysis with reasonable depth. The total design cycles and current ECO cycle count—this may factor in how close the current ECO cycle is to sign-off and how many further ECO cycles left. Many customers may prefer to divide the PBA modes in accordance to ECO cycles progress. Violating clock groups—this may analyze how many violating clock groups are there and what their individual violation state may be. It may be possible that some of the highly violating paths are sitting in only one of the path group and the remaining path groups are cleaner. While this highly violating group might need to be cleaned with default PBA first, other path groups might still need exhaustive analysis. Design technology-depending on the design technology being used (e.g., OCV/AOCV/SOCV), the user may want to handle the design violations fixing differently. GBA-PBA pessimism gap—the user may see GBA timing state by default and that timing state may or may present real timing state of design because of additional GBA pessimism. For example, some of the violations present in GBA analysis may not really be violations on PBA analysis. As such, any decision taken on the basis on GBA violations state might not be correct. Target design area/block-a user may be interested in only particular target area or block of design and therefore might want to take above calls related to that block itself.

Embodiments included herein address the issues listed above and may provide the best performance without compromising on quality of results (QOR) at sign-off state. The teachings of the present disclosure may allow designers to avoid any manual review during cycle to cycle transitions and may also help to boost the flow improvements as the solution allows for better decisions based upon design state and parameters.

In some embodiments, and referring again to FIG. 9, IPBA process may be configured to learn about the design state so that subsequent decision making may be performed effectively. If GBA has been performed, GBA timing may already be available at every endpoint. Although GBA timing provides a good first level snapshot of the violating state of the design, this snapshot should not be relied upon as GBA timing could be pessimistic by design and might be flagging some of the false violations.

Accordingly, to overcome this issue, the IPBA process may determine a design wide learning state with the help of PBA results. Since this learning step is expected to be significantly faster, the IPBA process may perform the PBA analysis of N paths per endpoint (N<10) and also evaluate the PBA timing of subsequent M (configurable) paths using the data for first N paths to collate the design wide PBA timing snapshot.

At the end of this step the IPBA process may have a reasonable PBA based design snapshot and it would have developed a fair bit of understanding about which regions are dirty (and to what extent) and which regions are hotspots and need to be targeted for fixing. A threshold α (configurable) (default=50 ps) may be defined by the user to further override the automated identification and marking of design's dirty areas. Any region may be marked as a target for adaptive analysis if it is concluded to be violating beyond the threshold α during the design wide learning step.

In some embodiments, IPBA process may utilize clock period based identification techniques. This may be used to mark the target areas for adaptive analysis by analyzing a clock period of the clocks for respective endpoints. Some designers may use a threshold β (~1-2% of clock period) filter leftover violations towards the sign-off stage. As such, it can be fairly assumed that if the endpoints are known to be PBA violating beyond this range, then they are very likely to be identified for fixing by the designers and good target to be leveraged for adaptive analysis. Embodiments of the present disclosure support this threshold β (default 1.5%, configurable) to be integrated with design wide learning step so that system can exploit this threshold for better analysis performance.

In some embodiments, IPBA process may include and/or exclude design hierarchies explicitly. There may be cases where designers are sure about some of the blocks to be included or excluded out of the potential adaptive analysis. An example for sure shot inclusion may occur when designers know that their K blocks out of the total N blocks are still in initial iterations and can be treated as adaptive by the tool. Another example for sure shot exclusion might be when designers know that these K blocks out of the total N blocks are cleaned up significantly and do not need to be treated as adaptive. Accordingly, the IPBA process included herein may also provide for explicit specification of inclusion and/or exclusion of design hierarchies/objects (and at the specific endpoint level) for potential adaptive analysis. This explicit inclusion/exclusion is not a mandatory requirement for the user, but this option is still there in case user is interested in explicit specification.

Initially when the design is in a dirty state, users are not expecting any timing analysis to be very accurate although they still expect the tool to generate PBA based results considering reasonably higher depth. So, at this stage, the tool needs to sense the state of the design and exploit this to improve the overall analysis runtime. If the design is significantly dirty, it should quickly generate the timing analysis results without the need to go deeper into every endpoint fan-in cone whereas if the design is in cleaner state, every endpoint's full depth may need to be analyzed to be able to report it true worst PBA slack. Accordingly, the IPBA process may include the ability to flag the design objects/hierarchies which may be targeted with adaptive analysis. In this way, the user may review these flags at the end of report generation and can take a final call in special cases like design waivers, etc.

In some embodiments, while trying to create an optimal tradeoff between a design's state and respective QOR, the IPBA process may ensure that a valid PBA violation is not missed at any point irrespective of the state of design. For example, if an endpoint E was violating in the $3^{rd}$ ECO iteration and was not flagged as violation at that point it may be problematic. Later on, if this endpoint was found to be violating during last ECO violation, it might not be trivial to fix it optimally.

In some embodiments, the IPBA process may be configured to ensure exhaustive coverage. While the proposed mode is targeting to improve the flow performance as per the design state, the expectation is still the exhaustive PBA based analysis and results should not be based upon any default PBA results which may be highly optimistic. For example, if an endpoint has total N (N>1M) paths the IPBA process may first perform a default PBA on this endpoint with M paths (M<20) and may select another K (K<100) paths which have a higher probability of becoming worst path for this endpoint. This way while it is able to capture the violation within first 10 paths, it also may have a higher probability of capturing the worst PBA slack for this endpoint by performing PBA analysis for (M+K) paths for this endpoint.

In some embodiments, the IPBA process may be configured to analyze one or more clock groups. In some cases, a given endpoint may be driven by multiple clock groups and one of the clock groups may be dirty and the other clock groups may be cleaner. In another case, it is possible that endpoints driven by clock group 1 are cleaner while other endpoints driven by clock group 2 are dirty. In such a case, a user may expect that while part of the design is expected to be dirty because of some specific clock groups/domain, it should not penalize the QOR of other endpoints which are cleaner. As such, the design wide timing state might give a false perception of the overall design state and any QOR vs flow efficiency tradeoff may need to be performed at endpoint and clock group level. The proposed mode decision making system included herein may analyze the given design from both perspectives. It may evaluate the overall design's violating state and the endpoint level timing for every clock group. Based upon both datapoints, it may decide what kind of flow improvements are required to be made for a given design. If the total number of PBA violating endpoints collected during the design state learning step described above are less than a $T_1$ threshold (configurable), the design's QOR may be treated at par with the sign-off stage and no tradeoff is done. However, if the overall violating endpoints count is greater than a $T_1$ threshold but some endpoints sitting in a particular clock group are relatively cleaner and close to sign-off, for those endpoints also no tradeoff is performed, and ideal exhaustive analysis is performed. For any remaining cases, where the overall violating endpoints count is greater than a $T_1$ threshold and the respective endpoints are guaranteed to have a PBA violating slack worst than a $T_2$ threshold, for such endpoints adaptive exhaustive coverage is ensured as discussed above. In this way, the adaptive IPBA process described herein may provide customized treatment to every endpoint and clock group based upon its own state and may not compromise on this endpoints QOR due to the dirty state of the design based upon other endpoints or clock groups.

In some embodiments, the IPBA process may provide a confirmation that when the design is at a sign-off state (or closer to sign-off), there may not be any QOR change with respect to default exhaustive IPBA analysis mode. This confirmation is by design and not only through data generation. If there is any endpoint for which a final analysis has not reported any PBA violation or has reported the PBA violation with a slack better than the $T_2$ threshold, it is confirmed that the tool would have done full depth PBA analysis for this endpoint and its final reported slack is sign-off worthy. It is due to this built in confirmation or guarantee that the user need not to worry about turning on and off this mode as the design propagates along the different ECO cycles and finally to a sign-off state.

With respect to QOR expectations, the adaptive mode described herein may provide a guarantee that irrespective of all flow improvements done, a valid PBA violating endpoint may never be missed. In general, it is expected that self adaptive mode IPBA slacks may closely match the worst possible PBA slacks across all paths for a given endpoint. The phrase "self-adaptive", as used herein, may refer to a framework, system or process that may learn about the design state by itself (without user inputs or guidance) and based upon this learning it can guide the subsequent analysis and optimization algorithm so that it may deliver an optimal runtime-QOR tradeoff. Such a framework, system or process will strive to achieve the best performance (e.g. minimum possible turnaround time) for analysis and optimization algorithms without compromising on QoR aspects.

As adaptive IPBA optimizes the PBA timing analysis as per the design state, it is possible that there might be some optimism for some of the endpoints but such cases are expected to be limited to those cases only where reported PBA slack is highly violating. Assuming no GBA path is remaining after depth exhaustion in EPBA reported paths, the following can be the expected accuracy trend:

$$GBA \text{ Slack} <= \text{Worst } EPBA \text{ Slack} <= \text{Adaptive } IPBA \text{ Slack}$$

Theoretically, some optimism may be seen for cases where an endpoint has reported with a final PBA slack equal to or worse than the $T_2$ threshold. In such cases, users may fix the reported violation so that subsequent worst paths for that endpoint will not occur in subsequent iterations.

Figure 10:
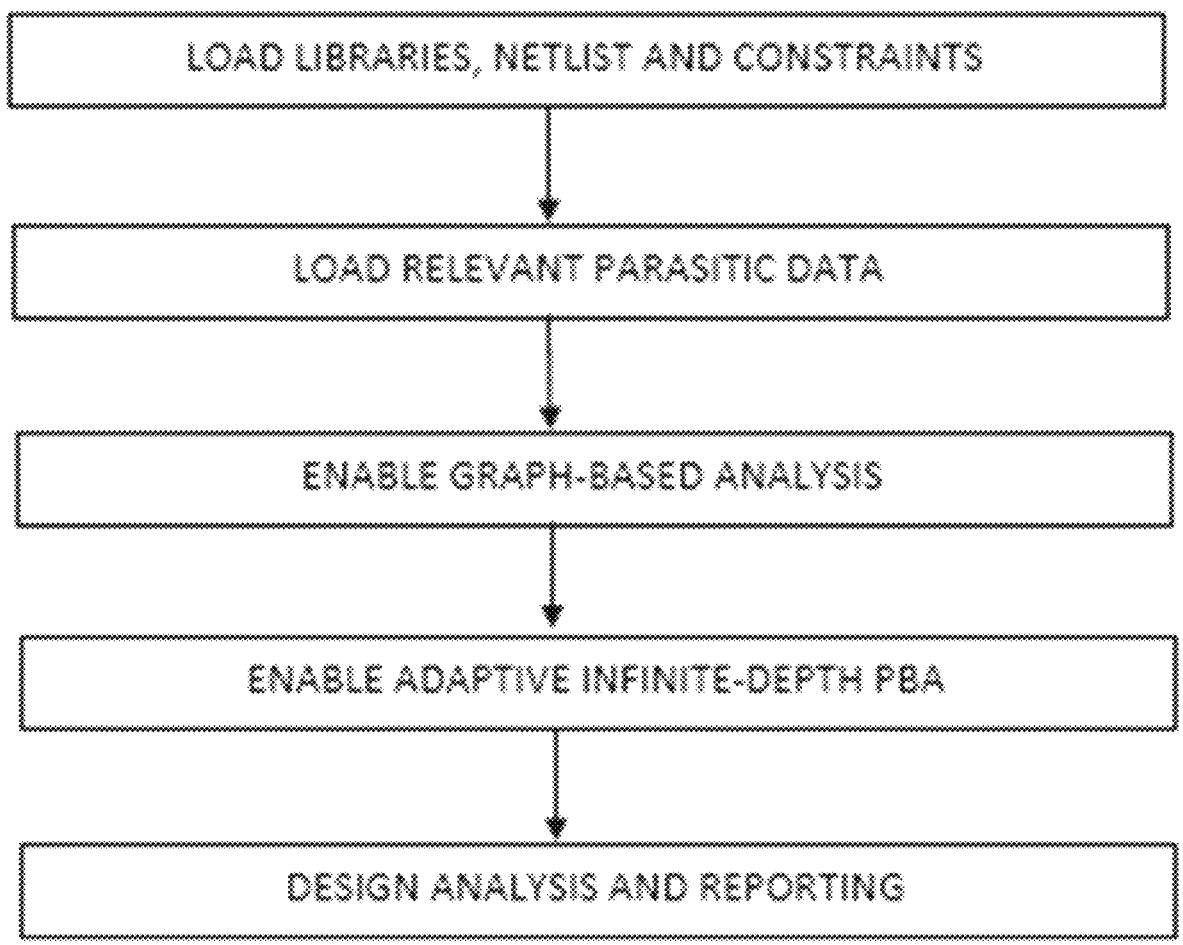
Figure 11:
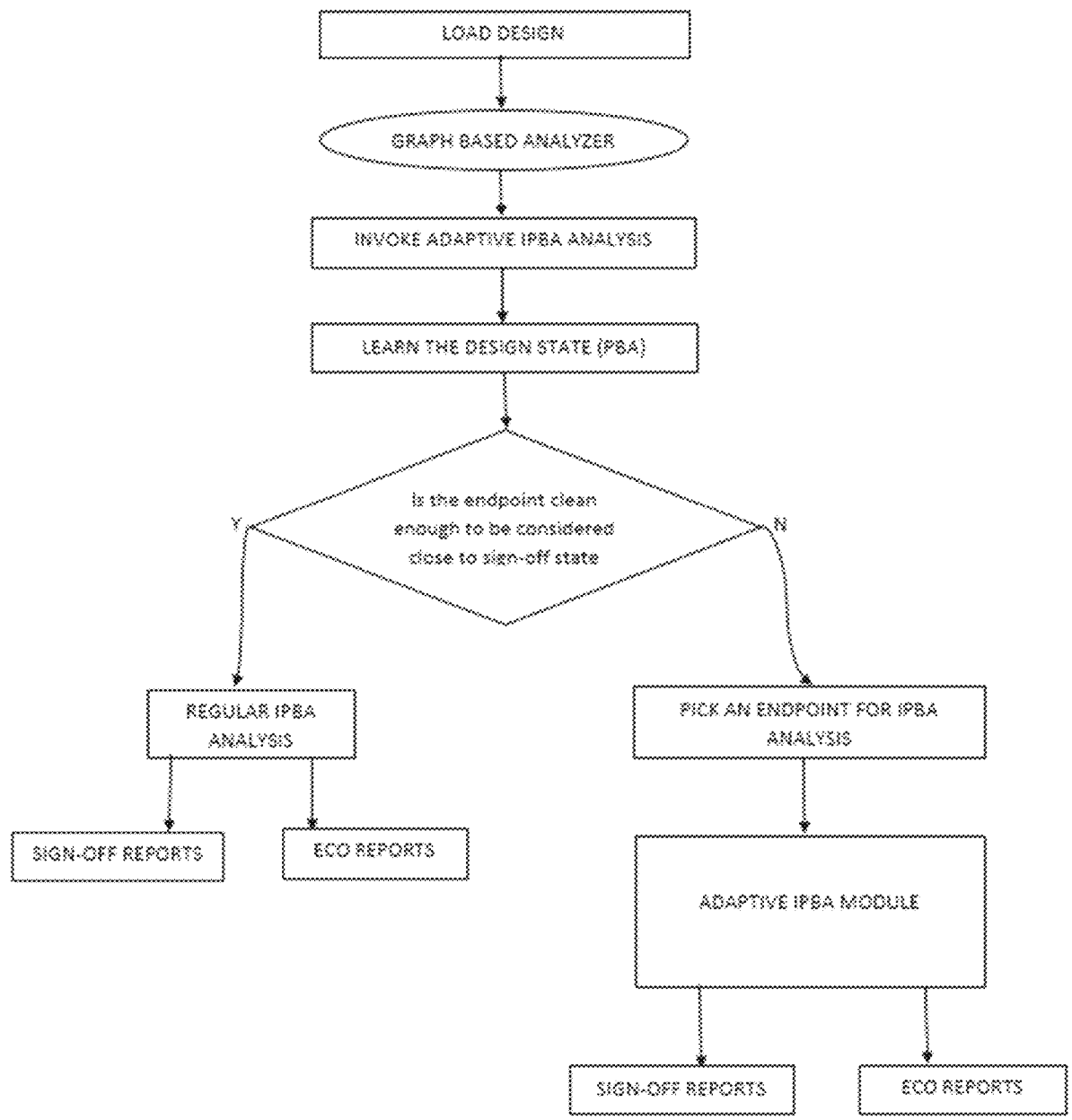
Figure 12:
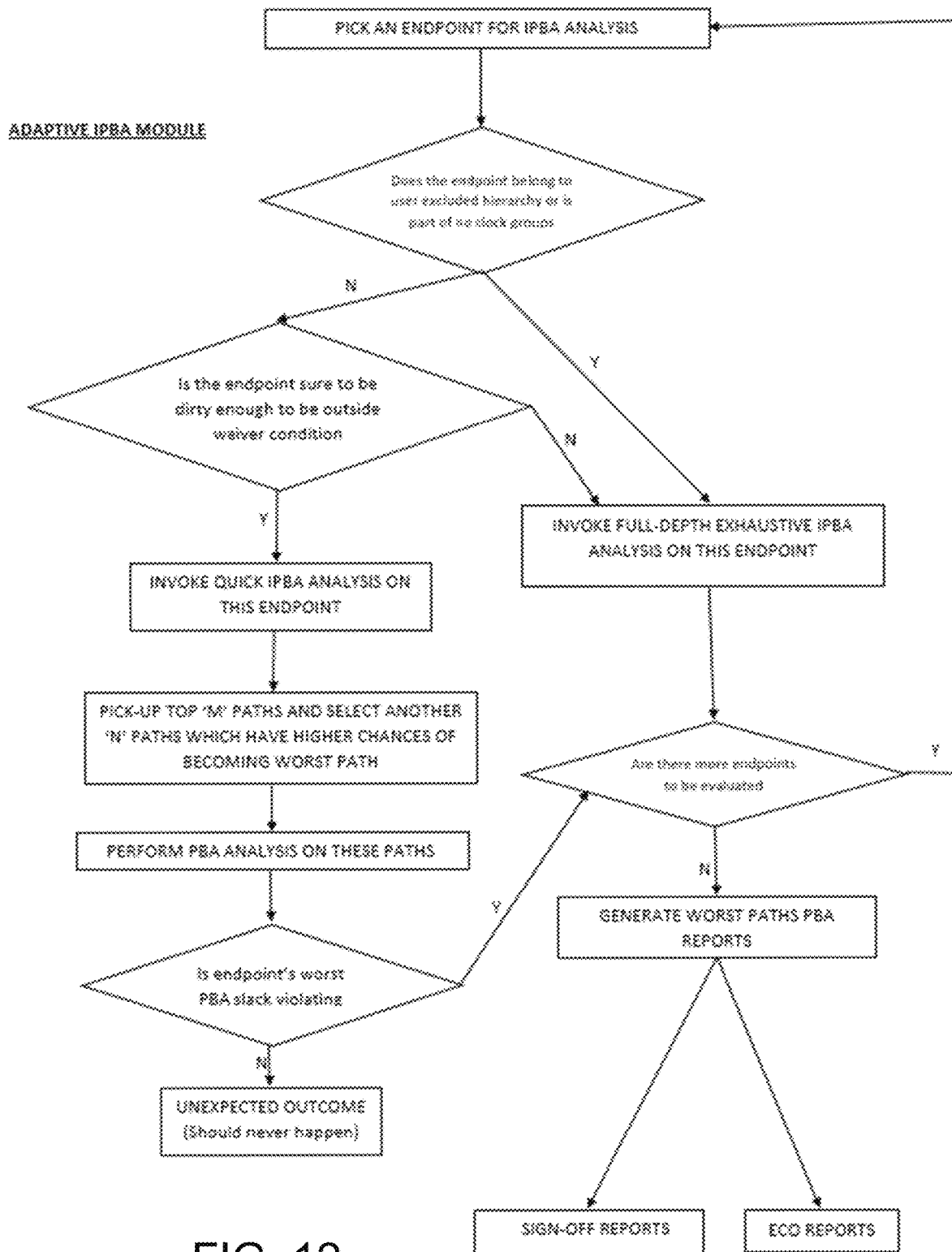
Figure 13:
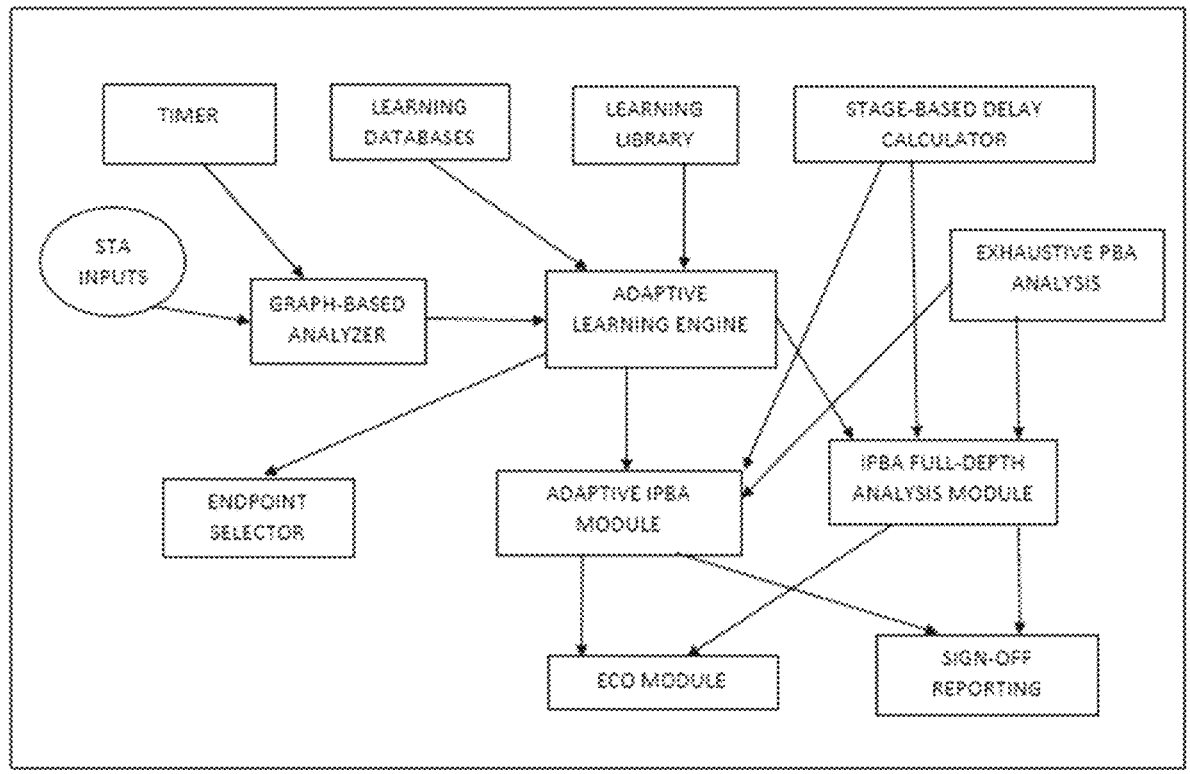
FIG. 13 is an exemplary block diagram consistent with embodiments of a self adaptive, infinite depth, path based analysis.

Referring also to FIG. 10, embodiments of IPBA process may provide for the regular setup of various files, such as libraries, netlist, constraints and parasitics. In operation, the user may enable the self adaptive IPBA flow through a simple setting and perform a regular PBA reporting (defining the GBA violating zone). In some embodiments, this feature may be triggered by default so that the user doesn't have to worry about the syncing up the signoff settings with state of design. Timing analysis may trigger the IPBA functionality which may perform an efficient and accurate PBA analysis on the defined GBA violating zone and report IPBA timing. The IPBA timing numbers reported are expected to be worthy enough for fixing and accurate for timing signoff.

Embodiments of the present disclosure may allow users to run extremely fast and efficient IPBA timing analysis for full designs irrespective of a design's state. Even during early stages of design cycle, for example when the design is dirty and in a highly violating state, designers want to undertake exhaustive path-based timing analysis to discount for the GBA pessimism and obtain an early understanding of the real timing covering all violating timing paths/endpoints of the design. As such, having a quick and efficient method with reduced pessimism compared to GBA and closer to exhaustive PBA accuracy may help analyze real timing violations early on and help achieve faster design closure. The PBA based timing analysis and signoff approaches described herein may provide faster PBA analysis convergence of timing paths with complete retimed coverage of GBA violating zone.

While there exist PBA approaches to increase design coverage and provide worst slacks, there is no technique under prior approaches that could self-adapt its behavior according to the design state with a guarantee for signoff accuracy. Accordingly, embodiments of the present disclosure provide complete PBA coverage with signoff accuracy and with significantly faster runtimes for designs in early state. In this way, users no longer need to review the PBA analysis settings at the end of every ECO cycle and make manual decisions.

The IPBA techniques included herein provide numerous advantages over existing approaches. For example, a self-adaptive PBA analysis mode is provided that may auto-optimize the PBA analysis flow for design coverage and efficiency and still guarantee sign-off level accuracy thereby reducing the risk and burden on the designer. Additionally and/or alternatively, the IPBA process may be configured to learn the overall design state quickly and leverage it to optimize the subsequent PBA flows and to guarantee the sign-off level accuracy for cleaner endpoints. Self-adaptive IPBA may learn about the design's state and leverage it for decision making to determine and align the efforts to be spent on respective endpoints during exhaustive PBA analysis. The IPBA process described herein may be used to determine the minimum threshold based upon a respective endpoint's clock period to identify the potential adaptive analysis target areas. In this way, self-adaptive IPBA may analyze all the clocks driving the respective endpoint and determine the minimum clock period threshold that may be used as guidance for potential adaptive analysis target areas. IPBA process may be used to include or exclude various design regions to mark the potential adaptive analysis target areas. The user in some cases may explicitly guide the adaptive analysis to include or exclude certain specific design hierarchies and/or design objects from potential adaptive analysis target areas. IPBA process may also be configured to determine the kind of PBA analysis done across different endpoints which may help to optimize the overall flow (particularly in the early state of design). As such, self-adaptive IPBA may pick up the paths intelligently for the endpoints which are significantly violated and may perform full depth analysis for endpoints which are cleaner. Self-adaptive IPBA reports may include flags/markers in final reports to flag the design objects/hierarchies targeted with adaptive analysis. The IPBA process may also ensure zero real violation misses even if a proposed mode is targeting to not do exhaustive analysis on full design. This may be performed without doing a full analysis and irrespective of the design state or ECO cycle. The IPBA process may determine a technique to select one or more paths for dirty endpoints such that final QOR for such endpoints is close to default full depth IPBA. Here, the target is to achieve the QOR closer to a full depth default IPBA QOR without analyzing all paths individually. The IPBA process may target self-adaptive IPBA graph creation for one or more selective nodes, for violating zones only or specific to some clock groups, and/or for user specified regions or for the entire graph itself. The proposed mode may operate for a full design by default and adapt automatically. In some embodiments, if needed it may be applied to specific set of endpoints, zone or clock groups etc. based on the chip designer's knowledge. It may also be applied selectively for setup or hold violating endpoints. The IPBA process may learn the design state and apply it beyond the scope of IPBA while also keeping the sign-off guarantee intact. This may be applied to optimize the overall flow beyond the scope of timing analysis also. Once there is enough understanding developed for a design's violating state, critical endpoints, hotspots, fixing target zones, etc., various flows may be optimized to exploit this design knowledge.

Figure 14:
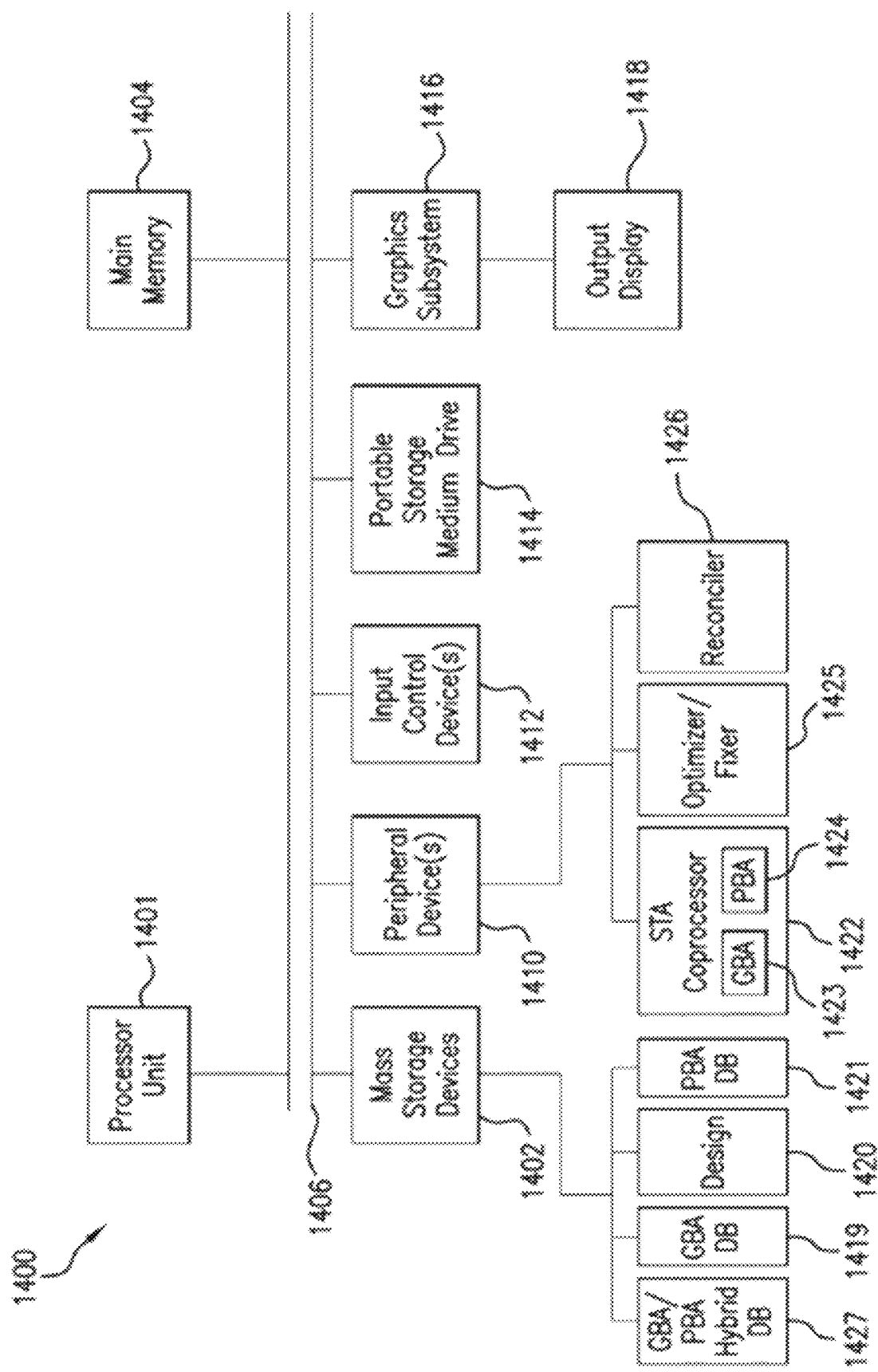
FIG. 14 is a block diagram illustrating an exemplary interconnection of components in a processor-based system for implementing an exemplary embodiment of the PBA process described herein.

Turning to FIG. 14, an exemplary block diagram of a computer system for hosting and/or executing an exemplary configuration of the disclosed system and method respectively is illustrated. A computer system 1400 contains a processor unit 1401, a main or primary memory 1404, an interconnect bus 1406, a mass storage device 1402, peripheral device(s) 1410, input control device(s) 1412, portable storage drive(s) 1414, a graphics subsystem 1410, and an output display 1418, amongst other components (components may be used herein at varying levels such as a gate component or a black-box type component such as, for example, the main memory component). Processor unit 1401 may include a single microprocessor or a plurality of microprocessors for configuring computer system 1400 as a multi-processor system, additionally, each physical processor unit 1401 may include a plurality of cores. Main memory 1404 stores, in part, instructions and data to be executed by processor 1401 along with circuit design data including timing data. Main memory 1404 preferably includes banks of dynamic random access memory (DRAM) as well as high-speed cache memory, such as static random access memory (SRAM) at various levels of the system architecture.

For the purpose of simplicity, the components of computer system 1400 are shown connected via interconnect bus 1406. However, computer system 1400 may be connected through one or more data transport means. Mass storage device 1402', which may be implemented with a magnetic disk drive, an optical disk drive, a solid state device, an attachment to network storage, cloud storage, a RAID arraying any of the above, and the like, is preferably a non-volatile storage device for storing data, databases, and instructions, to be used by processor unit 1401. In certain configurations, mass storage device 1402' may store portions of the software to load it into main memory 1404 or into a firmware or rom.

Portable storage medium drive 1414 operates in conjunction with a portable non-volatile storage medium such as a floppy disk, a compact disk read only memory (CD-ROM), or a digital versatile/video disk read only memory (DVD-ROM), to input and output data and code to and from the computer system 1400. In one configuration, software portions, circuit design data, and the like are stored on such a portable medium, and are input to computer system 1400 via portable storage medium drive 1414.

Peripheral device(s) 1410 may include any type of computer support device such as an input/output (I/O) interface, to add additional functionality to computer system 1400. For example, peripheral device(s) 1410 may include additional network interface cards to interface computer system 1400 to additional networks. Peripheral devices may include further specialized processors such as clustered video cards utilizing graphics processor unit (GPU) floating point processing logic to supplement or supplant CPU processing. Dynamically configurable logic such as, for example, field programmable gate arrays (FPGAs) may also be coupled to system 1400 through peripheral device(s) block 310. Still further, specialized application specific integrated circuits (ASICS) may be coupled thereto to implement specialized logic to accelerate or implement certain portions of the invention such as a timing analysis module, a data reduction module, and a correction module including an physical implementation optimizer engine. Such modules may be given direct access to memory (DMA) and may have their own memory integrated therein. Additionally, a rapid circuit prototype fabrication unit may be coupled to the system via a backplane or system IO port. Such fabrication unit may include, for example, a lithographic or 3d additive printer, operable to physically fabricate a circuit design defined by physical implementation data.

Input control device(s) 1412 provide a portion of the user interface for a computer system 1400 user. Input control device(s) 1412 may include an alphanumeric keypad for inputting alphanumeric and other key information; and a cursor control device such as a mouse, a track pad or stylus; or cursor direction keys.

In order to display textual and graphical information, computer system 1400 contains graphic subsystem 1410 and output display(s) 1418. Output display 1418 may include a cathode ray tube (CRT) display, liquid crystal display (LCD), active matrix organic light emitting diode (AMO-LED), plasma display, projector, or the like. Graphic subsystem 1410 receives textual and graphical information and processes the information for output to display 1418.

A GBA database 1419, design database 1420, PBA database 1421, and GBA/PBA hybrid database 1427 are coupled to mass storage devices 1402. An STA coprocessor 1422 containing a GBA processing module 1423 and a PBA processing module 1424 is coupled to peripheral devices 1410. An optimizer fixer module 1425 is coupled to peripheral devices 1410 as well as a database reconciler module 1426.

In a software implementation, the portions of software for certain measures may include a plurality of computer executable instructions, to be implemented on a computer system such as system 1400. Prior to loading in the computer system 1400 or firmware, the software may reside as encoded information on a computer-readable tangible medium such as a magnetic floppy disk, a magnetic tape, CD-ROM, DVD-ROM, flash memory, network attached storage (NAS), or any other suitable computer readable medium. Such software may control multiplexors, selectors, field programmable gate arrays (FPGAs), or the like to implement logical control of timing analysis, endpoint ranking, likely pessimism identification, likely PBA pessimism reduction nodes, path identification, and/or physical implementation optimization features.

In an illustrative implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Figure 15:
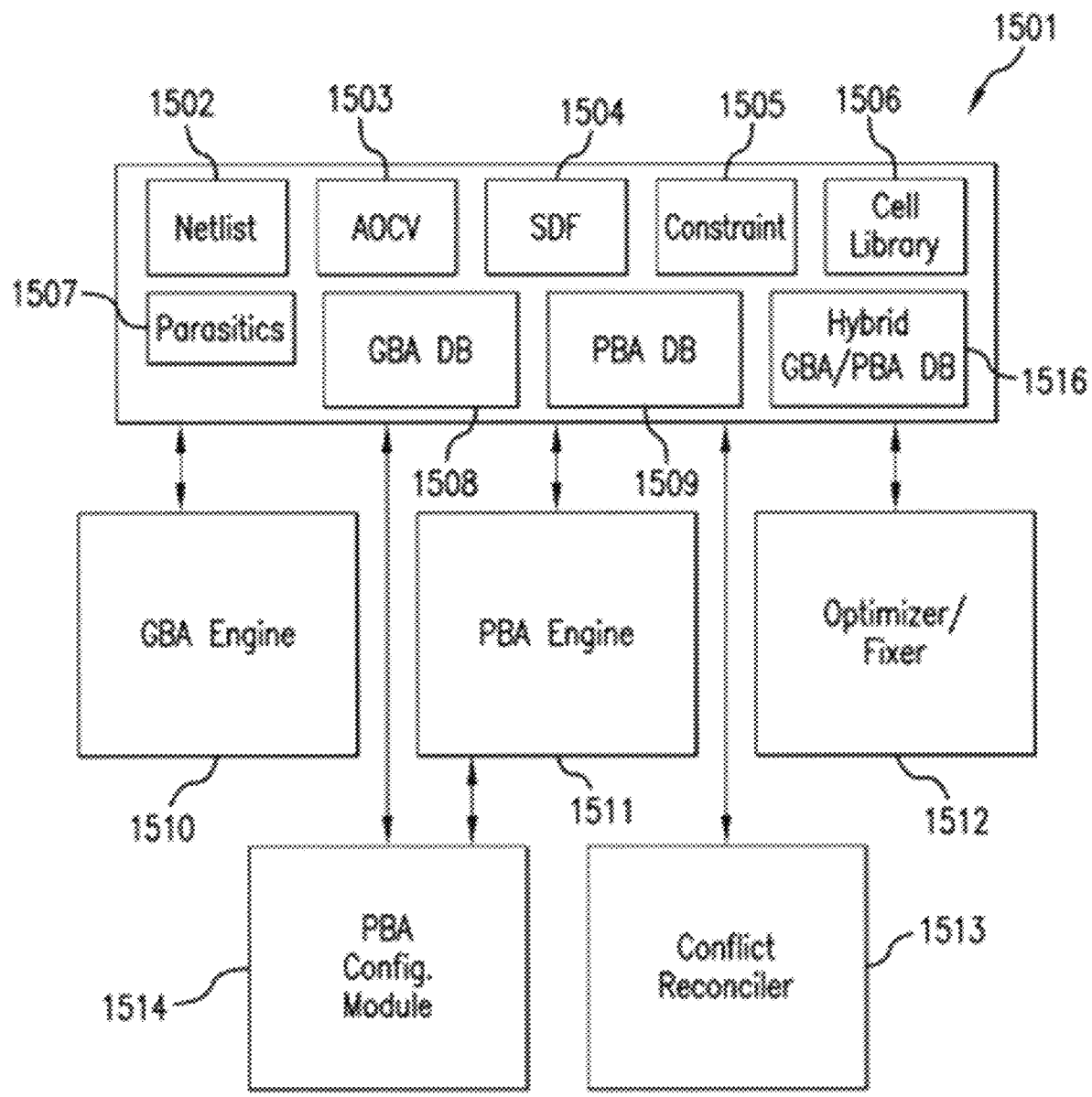
FIG. 15 is a block diagram illustrating an exemplary interconnection of components in a system for implementing an exemplary embodiment of the PBA process described herein.

As seen in FIG. 15, a storage module 1501 contains a plurality of databases, data stores, or data items including parasitics 1507, netlist data 1502 defining the circuit design, AOCV derate information 1503, standard delay format (SDF) 1504, constraint information 1505, cell library 1506, GBA timing database 1508, PBA timing database 1509, and GBA/PBA hybrid database 1516. Though GBA database 1508 and PBA database 1509 have been shown separately, these may be separately kept or merely one database may be kept for the first initial GBA values which are selectively fed by the PBA analyzer into the original GBA database rather than creating a separate PBA database and merging the two. Alternatively GBA database 1508 and PBA database 1509 may be left unchanged, but values may be taken from each to form a composite, hybrid GBA/PBA database 1516. The GBA engine 1510 takes various inputs such as 1502-1507 as data inputs in building a persistent model of the circuit and computing required and actual arrival times of signals at each of the nodes throughout the circuit. Upon completion of the GBA engine, the measured operational timing characteristics are recorded into the GBA database 1508.

PBA configuration module 1504 selectively sets a plurality of settings of the PBA analyzer according to designer input and determined allowed runtime, amongst other factors. Additionally, the PBA configuration module (based upon the configuration settings) analyzes the GBA database, preferably ranking it by magnitude and selecting the most critical paths thereof as candidates to be passed to the PBA engine 1511 for selective targeted pessimism removal therein. Upon arriving at a finalized configuration, the PBA engine 1511 is selectively executed according to the PBA configuration module 1514's determined configuration therefor. PBA engine 1511 receives the configuration settings and accesses the recorded operational timing characteristics stored in a GBA database 1508 according to the configuration thereof to select, rank, or identify the most critical violations determined in the GBA database 1508. PBA engine 1511 is then executed to re-evaluate those most critical selected nodes or paths for re-evaluation thereof and subsequent recordation into PBA database 1509. The updated, reduced pessimism operational timing characteristics are recorded in the PBA database 1509. The conflict reconciler 1513 traverses through the PBA database correlating GBA nodes with re-evaluated PBA nodes and selectively replacing GBA data with PBA data in the GBA database. Alternatively, the conflict reconciler 1513 may supplement PBA re-evaluated nodes in the PBA database 1509 with default GBA database values contained in the GBA database 1508 to thereby form a hybrid GBA and PBA database for output to optimizer module 1512 for subsequent fixing thereof.

Alternatively, a new composite hybrid GBA/PBA database 1516 may be created with selectively retrieved values from GBA database 1508 and PBA database 1509. Conflict reconciler 1513 may be employed to selectively retrieve PBA values and GBA values from PBA database 1509 and GBA database 1508 respectively merging the two into a new composite third database 1516. The new composite third database 1516 can be generated in encrypted/binary/ascii format and is preferably an independent representation of timing and signal integrity effects of a given design. While the GBA/PBA hybrid approach herein has been described in terms of STA, such approaches may be employed with any of the various flavors/varieties of signoff such as, for example, static, statistical, and the like. STA herein also may be employed with signal integrity analysis.

Conflict reconciler 1513 additionally propagates new PBA values through the timing graph or timing database according to predetermined static timing analysis rules and practices and determines conflict with upstream nodes and downstream nodes based on neighboring nodes. One such conflict is GBA vs. PBA values. PBA values should be used where available. Another such STA rule leading to inconsistencies is that a fan out cannot be less critical than any fan-in slack value. Such conflicts are addressed by selectively propagating other values based upon a predetermined ranking of PBA values versus original GBA values, upstream, and downstream neighboring nodes.

Figure 16:
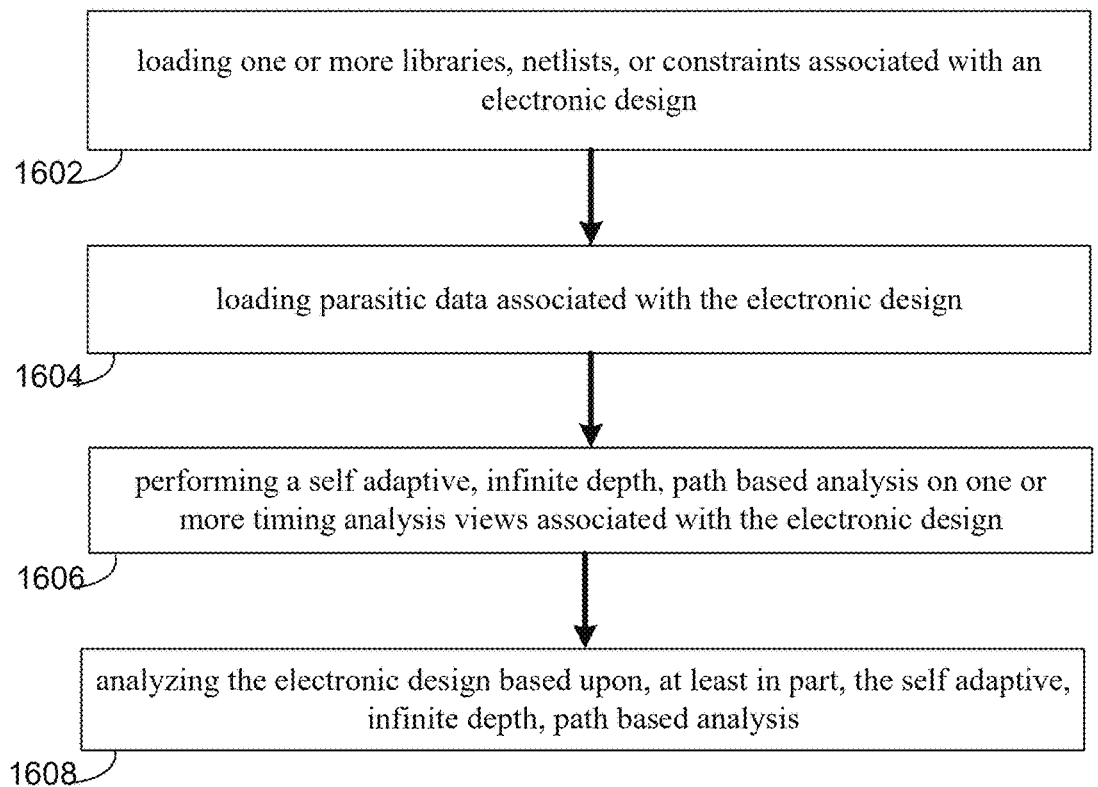
FIG. 16 is a flowchart depicting operations consistent with an exemplary embodiment of the self adaptive, infinite depth, path based analysis process described herein.

As shown in FIG. 16, one embodiment of PBA process may include loading (1602) one or more libraries, netlists, or constraints associated with an electronic design and loading (1604) parasitic data associated with the electronic design. Embodiments may further include performing (1606) a self adaptive, infinite depth, path based analysis on one or more timing analysis views associated with the electronic design. Embodiments may also include analyzing (1608) the electronic design based upon, at least in part, the self adaptive, infinite depth, path based analysis.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

The invention claimed is:

1. A computer-implemented method comprising:
loading one or more libraries, netlists, or constraints associated with an electronic design;
loading parasitic data associated with the electronic design;
performing a self adaptive, infinite depth, path based analysis on one or more timing analysis views associated with the electronic design; and
analyzing the electronic design based upon, at least in part, the self adaptive, infinite depth, path based analysis, wherein the self adaptive, infinite depth, path based analysis includes an endpoint violation level analysis; and performing a full depth analysis for an endpoint having a high level violation, wherein performing a full depth analysis for an endpoint having a high level violation includes identifying all endpoint violations associated with the electronic design.

2. The computer-implemented method of claim 1, wherein the self adaptive, infinite depth, path based analysis includes a clock period based identification process.

3. The computer-implemented method of claim 1, wherein the self adaptive, infinite depth, path based analysis includes an explicit include or explicit exclude user-selectable option or a default.

4. The computer-implemented method of claim 1, further comprising:
   determining a plurality of paths for at least one high level violation endpoint.

5. The computer-implemented method of claim 1, further comprising:
   generating, using an adaptive learning engine, a self adaptive, infinite depth, path based analysis graph for one or more selective zones, one or more violating zones, one or more zones specific to a specified clock group, a user specified region, or an entire graph.

6. A computer-readable storage medium having stored thereon instructions that when executed by a machine result in the following operations:
   loading one or more libraries, netlists, or constraints associated with an electronic design;
   loading parasitic data associated with the electronic design;
   performing a self adaptive, infinite depth, path based analysis on one or more timing analysis views associated with the electronic design; and
   analyzing the electronic design based upon, at least in part, the self adaptive, infinite depth, path based analysis, wherein the self adaptive, infinite depth, path based analysis includes an endpoint violation level analysis; and
   performing a full depth analysis for an endpoint having a high level violation, wherein performing a full depth analysis for an endpoint having a high level violation includes identifying all endpoint violations associated with the electronic design.

7. The computer-readable storage medium of claim 6, wherein the self adaptive, infinite depth, path based analysis includes a clock period based identification process.

8. The computer-readable storage medium of claim 6, wherein the self adaptive, infinite depth, path based analysis includes an explicit include or explicit exclude user-selectable option or a default.

9. The computer-readable storage medium of claim 6, further comprising:
   determining a plurality of paths for at least one high level violation endpoint.

10. The computer-readable storage medium of claim 6, further comprising:
    generating, using an adaptive learning engine, a self adaptive, infinite depth, path based analysis graph for one or more selective zones, one or more violating zones, one or more zones specific to a specified clock group, a user specified region, or an entire graph.

11. A system comprising:
    a computing device having at least one processor configured to load one or more libraries, netlists, or constraints associated with an electronic design, the at least one processor further configured to load parasitic data associated with the electronic design, the at least one processor further configured to perform a self adaptive, infinite depth, path based analysis on one or more timing analysis views associated with the electronic design and to analyze the electronic design based upon, at least in part, the self adaptive, infinite depth, path based analysis, wherein the self adaptive, infinite depth, path based analysis includes an endpoint violation level analysis, the at least one processor further configured to perform a full depth analysis for an endpoint having a high level violation, wherein performing a full depth analysis for an endpoint having a high level violation includes identifying all endpoint violations associated with the electronic design.

12. The system of claim 11, wherein the self adaptive, infinite depth, path based analysis includes a clock period based identification process.

13. The system of claim 11, wherein the self adaptive, infinite depth, path based analysis includes an explicit include or explicit exclude user-selectable option or a default.

* * * * *